United States Patent
Schreck et al.

(10) Patent No.: US 7,324,299 B1
(45) Date of Patent: Jan. 29, 2008

(54) DISK DRIVE THAT POSITIONS A HEAD AT MULTIPLE HEAD-TO-DISK SPACINGS

(75) Inventors: Erhard Schreck, San Jose, CA (US); Donald J Brunnett, Pleasanton, CA (US); Jingbo Yu, San Jose, CA (US); Francis P. Crimi, San Jose, CA (US); Scott Hughes, Cupertino, CA (US); Duc Banh, San Jose, CA (US); Anthony R. Hurtado, Cupertino, CA (US); Kazuhiro Saito, San Jose, CA (US); Andrew LeFebvre, Campbell, CA (US); Chris Hawks, Saratoga, CA (US); Thao Anh Nguyen, San Jose, CA (US); Brian Strom, Cupertino, CA (US); Bruce C. Schardt, Tracey, CA (US)

(73) Assignee: Maxtor Corporation, Longmont, CO (US)

( * ) Notice: Subject to any disclaimer, the term of this patent is extended or adjusted under 35 U.S.C. 154(b) by 77 days.

(21) Appl. No.: 11/101,114

(22) Filed: Apr. 7, 2005

Related U.S. Application Data

(60) Provisional application No. 60/560,832, filed on Apr. 8, 2004.

(51) Int. Cl.
 *G11B 21/02* (2006.01)
 *G11B 5/596* (2006.01)
 *G11B 5/58* (2006.01)

(52) U.S. Cl. ........................ 360/75; 360/78.04

(58) Field of Classification Search ............... None
See application file for complete search history.

(56) References Cited

U.S. PATENT DOCUMENTS

| 4,777,544 | A |   | 10/1988 | Brown et al. |
|---|---|---|---|---|
| 5,377,058 | A | * | 12/1994 | Good et al. .................... 360/75 |
| 5,421,943 | A |   | 6/1995 | Tam et al. |
| 5,677,808 | A | * | 10/1997 | Cha et al. ................ 360/78.07 |

(Continued)

OTHER PUBLICATIONS

U.S. Appl. No. 10/211,671, filed Aug. 2, 2002, McKenzie et al.

*Primary Examiner*—William Korzuch
*Assistant Examiner*—Jason Olson
(74) *Attorney, Agent, or Firm*—Westman, Champlin & Kelly, P.A.

(57) ABSTRACT

A disk drive having a drive housing, a storage disk that is rotatably coupled to the drive housing, and a slider assembly that includes a head and a slider mover. The head reads data from the storage disk during a read operation and writes data to the storage disk during a write operation. The slider mover maintains the head at a read HtD spacing during the read operation, at a pre-write HtD spacing during the read operation prior to the write operation, at a write HtD spacing during the write operation, and at an idle HtD spacing when the drive is not performing the read operation or the write operation. The disk drive includes a drive circuitry that directs a read power level to the slider mover to maintain the head at the read HtD spacing, a pre-write power level to maintain the head at the pre-write HtD spacing, a write power level to maintain the head at the write HtD spacing, and a idle power level to maintains the head at the idle HtD spacing.

24 Claims, 16 Drawing Sheets

U.S. PATENT DOCUMENTS

| | | |
|---|---|---|
| 5,862,015 A | 1/1999 | Evans et al. |
| 5,880,626 A | 3/1999 | Dean |
| 5,880,899 A | 3/1999 | Blachek et al. |
| 5,959,801 A | 9/1999 | Gillis et al. |
| 5,965,840 A | 10/1999 | Nagarajan et al. |
| 5,991,113 A | 11/1999 | Meyer et al. |
| 5,999,372 A | 12/1999 | Peterson et al. |
| 6,011,239 A | 1/2000 | Singh et al. |
| 6,195,219 B1 | 2/2001 | Smith |
| 6,288,856 B1 | 9/2001 | Ottesen et al. |
| 6,452,740 B1 | 9/2002 | Ghoshal |
| 6,538,836 B1 | 3/2003 | Dunfield et al. |
| 6,735,036 B1 | 5/2004 | Olim |
| 6,768,610 B1 | 7/2004 | Morris et al. |
| 2001/0030822 A1 | 10/2001 | Boutaghou et al. |
| 2002/0067565 A1 | 6/2002 | Kelemen |
| 2002/0097528 A1 | 7/2002 | Williams et al. |
| 2003/0011915 A1 | 1/2003 | Riddering et al. |
| 2003/0174430 A1 | 9/2003 | Takahashi et al. |
| 2005/0052773 A1 | 3/2005 | Suk |
| 2005/0057841 A1 | 3/2005 | Stover et al. |
| 2005/0078400 A1 | 4/2005 | Hassan |

* cited by examiner

DISK DRIVE THAT POSITIONS A HEAD AT MULTIPLE HEAD-TO-DISK SPACINGS

RELATED APPLICATION

This Application claims the benefit on U.S. Provisional Application Ser. No. 60/560,832 filed on Apr. 8, 2004. The contents of U.S. Provisional Application Ser. No. 60/560,832 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider assembly having an air bearing surface, and a read/write head that transfers information to and from the storage disk. The rotation of the storage disk causes the slider assembly to ride on an air bearing so that the read/write head is at a distance from the storage disk that is referred to as a "head-to-disk spacing" (also sometimes referred to herein as a "HtD spacing" or a "flying height").

Because today's disk drives utilize storage disks having increasingly high densities of data tracks, decreasing the HtD spacing has become of great importance. However, this desire for a very small HtD spacing must be balanced with tribological concerns in order to avoid damage to the read/write head and/or the storage disk, as well as loss of data.

Further, a large variation in the HtD spacing from slider assembly to slider assembly can cause significant issues in the manufacturing and reliability of the disk drives. Additionally, maintaining a relatively small and consistent HtD spacing is further complicated by other factors such as thermal pole tip protrusion caused by thermal expansion of the read/write head during various disk drive operations. For example, during a write operation, the electrical resistance of the write element generates heat in and around the read/write head, resulting in thermal expansion of the write pole tips toward the storage disk. The situation is commonly referred to a write pole tip protrusion ("WPTP"). If the WPTP is too extensive, the slider assembly can unintentionally contact the storage disk, causing off-track writing, damage to the slider assembly, damage to the storage disk and/or a permanent loss of data.

SUMMARY

The present invention is directed to a disk drive that includes a drive housing, a storage disk that is rotatably coupled to the drive housing, and a slider assembly that includes a head and a slider mover. The head reads data from the storage disk during a read operation and writes data to the storage disk during a write operation. In one embodiment, the slider mover maintains the head at a first HtD spacing during the read operation, and at a second HtD spacing that is different from the first HtD spacing during the read operation. In certain embodiments, the second HtD spacing is greater than the first HtD spacing. Further, the slider mover maintains the head at the second HtD spacing prior to the write operation. With this design, as discussed in more detail below, the head is less likely to contact the storage disk during a transition from a read operation to a write operation.

The disk drive can include a drive circuitry that directs different power levels to the slider mover. For example, the drive circuitry can direct (i) a read power level to maintain the head at a read HtD spacing during the read operation, (ii) a pre-write power level to maintain the head at a pre-write HtD spacing during the read operation prior to the write operation, (iii) a write power level to maintain the head at a write HtD spacing during the write operation, and/or (iv) a idle power level to maintain the head to an idle HtD spacing. In certain embodiments, the read power level is greater than the other power levels, the idle power level is less than the other power levels, and/or the idle HtD spacing is greater than the other HtD spacings. For example, the head can be maintained at the idle HtD spacing when the drive is not performing a read operation or a write operation. With this design, the head is moved to a higher and safer HtD spacing when the drive is not transferring data and the slider mover consumes less power at this time.

In another embodiment, the slider mover maintains the head at a read HtD spacing during the read operation, a write HtD spacing during the write operation, and a different HtD spacing that is different from the read HtD spacing and the write HtD spacing. Stated in another fashion, the drive circuitry directs to the slider mover a read power level to maintain the head at the read HtD spacing, a write power level to maintain the head at the write HtD spacing, and a different power level to maintain the head at the different HtD spacing. In one version, the different HtD spacing is the pre-write HtD spacing. In another version, the different HtD spacing is the idle HtD spacing. In still another version, the different HtD spacing is a data recovery HtD spacing.

In yet another embodiment, at different times, the drive circuitry directs to the slider mover a first power level to move the head to a first HtD spacing, a second power level to move the head to a second HtD spacing, a third power level to move the head to a third HtD spacing, and/or a fourth power level to move the head to a fourth HtD spacing.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

The present invention is directed toward a disk drive that accurately determines an actual HtD spacing for one or more read/write heads in the disk drive. By determining an amplitude of a variable gain amplifier signal at a known HtD spacing, other otherwise unknown HtD spacings can be ascertained. Further, other desired HtD spacings can be achieved using a slider mover that that dynamically adjusts the HtD spacing. With this design, in certain embodiments, the disk drive can (i) precisely position one or more of the heads at different HtD spacings during different operations of the disk drive, (ii) perform a performance test on one or more of the heads and position one or more of the heads based on the performance results, (iii) reduce the distribution of the HtD spacings during certain operations of the disk drive, and/or (iv) recover data from the storage disk that would otherwise be unreadable.

Figure 1:
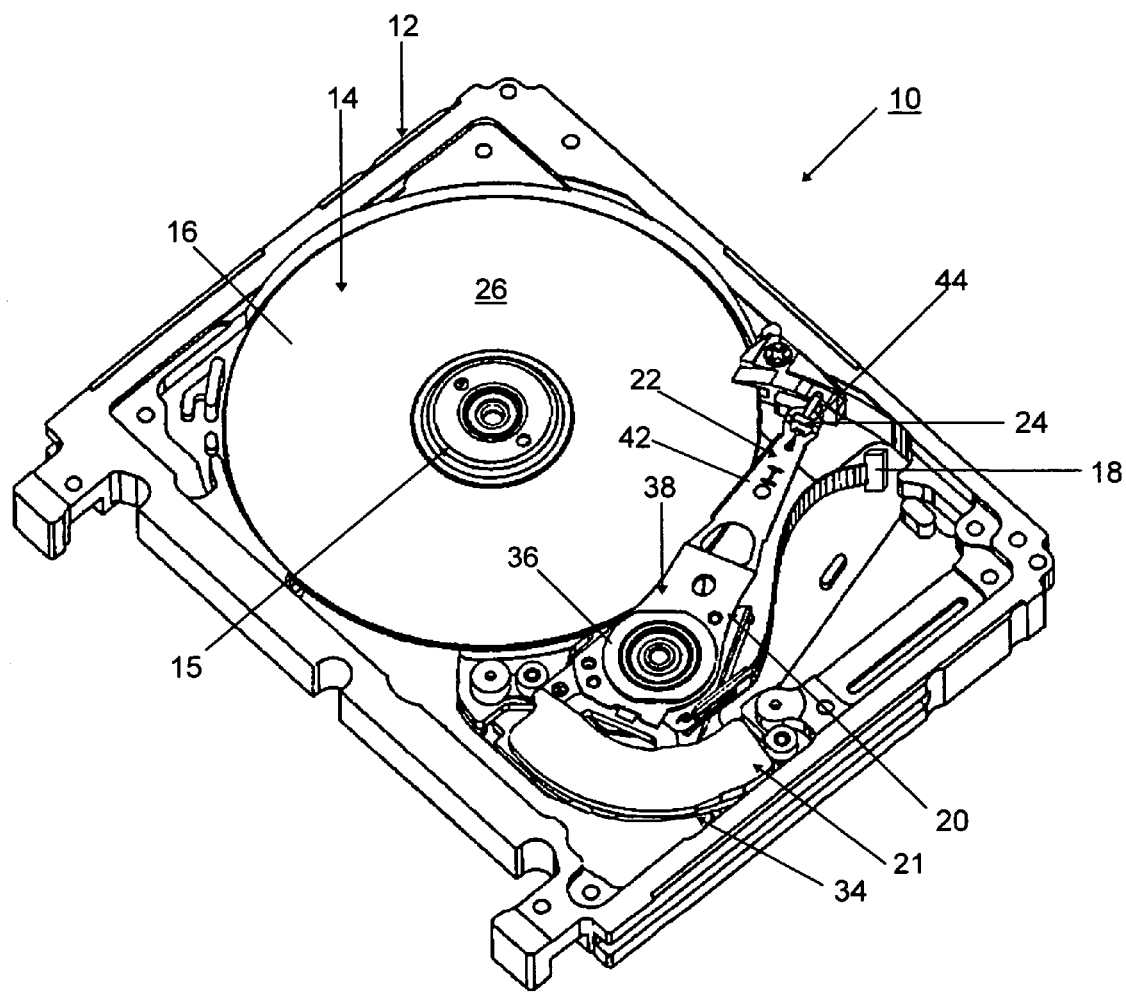
FIG. 1 is a perspective view of a disk drive having features of the present invention.

FIG. 1 illustrates a perspective view of a disk drive 10 that includes (i) a drive housing 12, (ii) a disk assembly 14 having a spindle motor 15 and one or more storage disks 16 coupled to the spindle motor 15, (iii) a drive circuitry 18, and (iv) a head stack assembly 20 including an actuator assembly 21 and one or more head suspension assemblies 22, with each head suspension assembly 22 including a slider assembly 24.

Each storage disk 16 includes one or more disk data storage surfaces 26 that each has a plurality of concentric data tracks that store data, including a target track. Further, the storage disk 16 can also include non-data tracks, such as servo tracks that store servo information. Data from the data tracks is read from the storage disk 16 during a read operation and data is transferred to the data tracks of the storage disk 16 during a write operation. The read and write operations can each include a seek mode during which the actuator assembly 21 rapidly moves the slider assembly 24 to near the target track. The read and write operations can also include a settle mode which commences once the slider assembly 24 is positioned proximate the target track. Further, the read and write operations include a track following mode once the slider assembly 24 has settled or stabilized over the target track. Additionally, once the slider assembly 24 stabilizes over the target track, the read and/or write operations include the transfer of data between the slider assembly 24 and the storage disk 16.

The drive circuitry 18 sends and/or receives electrical current from the slider assembly 24 during read and/or write operations of the disk drive 10. Moreover, the drive circuitry 18 can control several additional functions within the disk drive 10. As provided herein, the drive circuitry 18 can receive signals from the slider assembly 24 and/or other components of the disk drive 10, which can be used to detect contact between the slider assembly 24 and the storage disk 16. Further, the drive circuitry 18 can direct power to the slider assembly 24 to dynamically adjust and control the spacing between portions of the slider assembly 24 and the storage disk 16. Moreover, the drive circuitry 18 can perform one or more performance tests on the one or more slider assemblies 24.

The drive circuitry 18 can be included in one or more printed circuit board assemblies (not shown). Further, the drive circuitry 18 can include one or more preamplifiers that can adjust and/or amplify the electrical signals that are transmitted between the slider assembly 24 and other components of the drive circuitry 18. In one embodiment, the drive circuitry 18 is secured to and enclosed by the drive housing 12.

The head stack assembly 20 illustrated in FIG. 1 includes an actuator motor 34, an actuator hub 36, one head suspension assembly 22, and one actuator arm 38. The actuator motor 34 rotates the actuator arm 38 and the head suspension assembly 22 relative to the storage disk 16. The head stack assembly 20, alternatively, can include a plurality of actuator arms 38 that each supports up to two head suspension assemblies 22. Each head suspension assembly 22 includes the slider assembly 24, which is supported by a load beam 42 and a flexure (not shown). The head suspension assembly 22 is secured to the actuator arm 38, and supports the slider assembly 24 proximate one of the disk surfaces 26 of the storage disk 16.

Each slider assembly 24 transfers information between the drive circuitry 18 and the storage disk 16 during a data transfer operation. The design of each slider assembly 24 can vary pursuant to the teachings provided herein. Further, various embodiments of disk drives and slider assemblies are described in co-pending U.S. patent application Ser. No. 10/211,671, filed by McKenzie, et al. on Aug. 2, 2002, and assigned to Maxtor Corporation. The contents of U.S. patent application Ser. No. 10/211,671 are incorporated herein by reference.

Figure 2A:
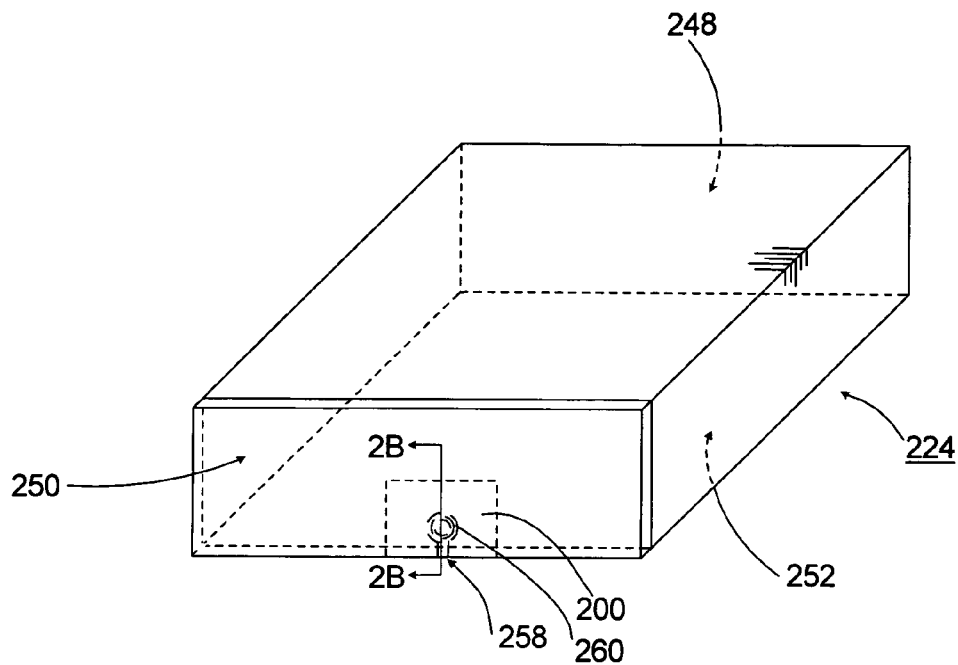
FIG. 2A is a perspective view of a slider assembly having features of the present invention including a slider mover.

FIG. 2A illustrates a rear perspective view of one embodiment of the slider assembly 224. In this embodiment, the slider assembly 224 includes a read/write head 258 and a slider mover 200 (illustrated in phantom) that moves the read/write head 258 to precisely control the HtD spacing. In one embodiment, the slider mover 200 is a slider deformer that selectively deforms a portion of the slider assembly 224 near the read/write head 258 in order to move the head 258 and change the HtD spacing. The read/write head 258 includes a write element 260 (illustrated in phantom). The slider assembly 224 further includes a leading surface 248, an opposed trailing surface 250 and a flying surface 252, which forms an air bearing surface (ABS) of the slider assembly 224.

Figure 2B:
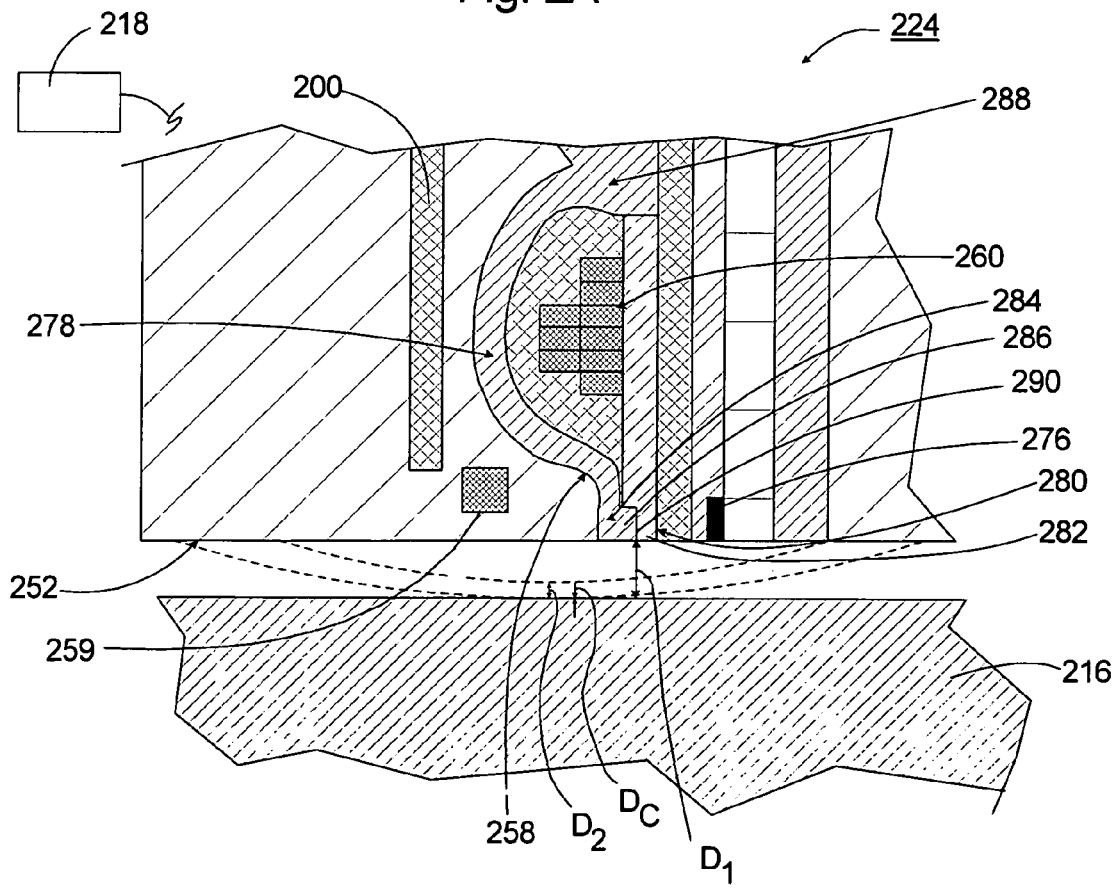
FIG. 2B is an enlarged cross-sectional view of a portion the slider assembly of FIG. 2A while a non-contact power level and a contact power level are directed to the slider mover.

FIG. 2B is an enlarged, partial cross-sectional illustration of the slider assembly 224 shown in FIG. 2A, and a portion of a storage disk 216. FIG. 2B illustrates that the read/write head 258 includes a read head 276 and a write head 278. In one embodiment, the slider assembly 224 includes a temperature sensor 259 that is embedded into the slider body. In certain designs, the temperature sensor 259 can monitor the temperature of the slider assembly 224 near the read/write head 258 and transfer the information to the drive circuitry 218. With information regarding temperature, in some embodiments, the drive circuitry 218 can more accurately determine the level of power that is directed to the slider mover 200.

The positioning and number of slider movers 200 can be varied. Moreover, the composition and geometry of the slider mover 200 can be varied to suit the design requirements of the slider assembly 224 and the disk drive 10. For example, the slider mover 200 can be a heater element, e.g. a coil that is positioned as a planar layer that is substantially parallel to the trailing surface 250. With this design, current directed to the coil generates heat that causes a controlled thermal deformation of the area surrounding the coil. Alternatively, for example, the slider mover 200 can also be positioned to not be parallel to the trailing surface 250.

In FIG. 2B, the slider mover 200 is not in direct electrical communication with the write element 260. Stated another way, the slider mover 200 can be substantially electrically isolated and/or decoupled from the write element 260, e.g. the slider mover 200 is not in direct contact with the write element 260, nor is there any significant electrical coupling between the slider mover 200 and the write element 260. Alternatively, the slider mover 200 and the write element 260 can be electrically coupled, or they can be directly connected.

The amount in which the slider mover 200 can adjust the HtD spacing will vary according to the design of the slider assembly 224 and the slider mover 200. For example, in alternative, non-exclusive embodiments, the drive circuitry 218 can direct power to the slider mover 200 to lower the HtD spacing at least approximately 3, 4, 5, 6, 7, 8, 9, 10, or 11 nm. Further, the level in which the drive circuitry 28 directs power to the slider mover 200 will vary according to the design of the slider assembly 224, the slider mover 200, and the amount of HtD spacing adjustment necessary. For example, the drive circuitry 28 can direct power to the slider mover 200 at any rate between approximately 0 and 100 mW. In this embodiment, the minimum power is 0 and the maximum power is 100 mW.

The positioning and design of the write head 278 can be varied. In FIG. 2B, the write head 278 includes a leading pole 280 having a leading pole tip 282, a trailing pole 284 having a trailing pole tip 286, a yoke 288, and a write head gap 290.

More specifically, FIG. 2B illustrates the general relationship between an actual HtD spacing $D_1$ when the drive circuitry 218 is directing a first non-contact power level to the slider mover. As used herein, the first non-contact power level can be a relatively low level of power, zero power, or any power that does not cause contact between the slider assembly and the storage disk. At various times during manufacturing or post-manufacturing operation of the disk drive, little or no power is directed to the slider mover 200, and little or no deformation occurs in the area of the read/write head 258 or the flying surface 252, as illustrated in FIG. 2B. As referred to herein, during times when the read/write head 258 is not contacting the storage disk, the slider assembly is said to be in a non-contact position.

FIG. 2B also illustrates in phantom, the deformed flying surface 252D and the relationship between the actual HtD spacing $D_c$ that occurs when the drive circuitry 218 is directing a contact power level to the slider mover. The contact power level represents at least a minimum amount of power to cause movement, e.g. a sufficient thermal expansion, of a portion of the slider assembly 224 that results in relatively consistent, non-destructive physical contact between the slider assembly 224 and the storage disk 216.

As referred to herein, upon head-to-disk contact, the slider assembly 224, including the read/write head 258, is said to be in a contact position relative to the storage disk 216. The portion of the slider assembly 224 illustrated in phantom is shown as a relatively smooth curve for purposes of illustration and to show the contrast with the slider assembly 224 in the non-contact position (illustrated by solid lines). It is recognized that when the slider assembly 224 is in the contact position, the actual configuration of the slider assembly 224, including the read/write head 258 may not be completely smooth, but can have a somewhat jagged or otherwise inconsistent configuration.

Consistent contact between the slider assembly 224 and the storage disk 216 is also referred to herein as "head-to-disk contact", and the HtD spacing is approximately equal to 0 nm. As used herein, head-to-disk contact is distinguished from sporadic or anomalous contact that occurs when the slider assembly 224 contacts a thermal asperity (not shown) or some other surface deviation on the storage disk 216, which normally has a duration on the order of less than one microsecond up to approximately 3 microseconds.

In contrast, head-to-disk contact as used herein has a duration that is sufficient to establish non-anomalous contact between the slider assembly 224 and the storage disk 216, such as a relatively consistent flying height of 0 nm. Stated another way, the disk drive 10 and methods provided herein facilitate a determination of head-to-disk contact having a requisite duration that establishes a substantially constant flying height or HtD spacing of 0 nm. In one embodiment, non-anomalous head-to-disk contact has a duration that is greater than approximately 10 microseconds. In alternative non-exclusive embodiments, head-to-disk contact can have a duration that is greater than approximately 25, 50, 100, 500, 1000, 2000 or 8000 microseconds which is recognized by one or more of the methods provided herein. Head-to-disk contact of this relatively long duration clearly establishes non-anomalous contact between the read/write head 258 and the storage disk 216.

As provided herein, head-to-disk contact can be intentionally induced during production, self-testing and/or optimization processing of the disk drive, and/or on a predetermined (automatic) or an "as needed" (manual) basis during post-manufacturing, in situ operation of the disk drive 10. For example, head-to-disk contact can be intentionally caused before, during, or after self-testing and/or during an optimization process of the disk drive 10. In one embodiment, by purposely causing non-destructive head-to-disk contact and/or withdrawing the slider assembly 224 from non-destructive head-to-disk contact, and by providing the ability to accurately detect when the slider assembly 224 changes between the non-contact position and the contact position (in either direction), each slider assembly 224 of the disk drive 10 can be calibrated to more precisely determine, monitor and/or adjust the HtD spacing during various operations of the disk drive 10.

For example, as provided herein, the drive circuitry 218 can detect the approximate moment when actual, relatively consistent head-to-disk contact first occurs (changing from the non-contact position to the contact position). Alternatively, or in addition, the drive circuitry 218 can detect the approximate moment when the slider assembly 224 is first withdrawn from relatively consistent contact with the storage disk 216 (changing from the contact position to the non-contact position).

Head-to-disk contact provides a "zero-clearance reference" that is used in various applications relative to HtD spacing, as set forth herein. Once the zero-clearance reference is established, the drive circuitry 218 can monitor relative changes in the actual HtD spacing, and can also accurately determine and facilitate adjustment of the actual HtD spacing at any time during operation of the disk drive 10. Further, with this design, the disk drive 10 can operate at a more suitable HtD spacings depending upon the specific operation being performed.

Head-to-disk contact can be induced by directing power to the slider mover 200 while the slider assembly 224 is flying during rotation of the storage disk 216 to cause a portion of the slider assembly 224 to deform toward the storage disk 216. Power to the slider mover 224 can be maintained or increased until head-to-disk contact is determined by one of the methods provided herein. Alternatively, head-to-disk contact can be induced by other methods, such as by use of an actuator means, by altering the rotational velocity of the storage disk, by altering the orientation of the slider assembly relative to the storage disk, or by any other suitable method known to those skilled in the art.

Moreover, FIG. 2B illustrates in phantom the general relationship between the actual head-to-disk spacing $D_2$ when a second non-contact power level is directed to the slider mover 200. The second non-contact power level can be any power level greater than the first non-contact power level, but which does not result in head-to-disk contact $D_c$. The second non-contact power level can be directed by the drive circuitry 218 either following intentional head-to-disk contact (following or during calibration), or before any such head-to-disk contact has occurred in the disk drive, as described below.

Figure 3A:
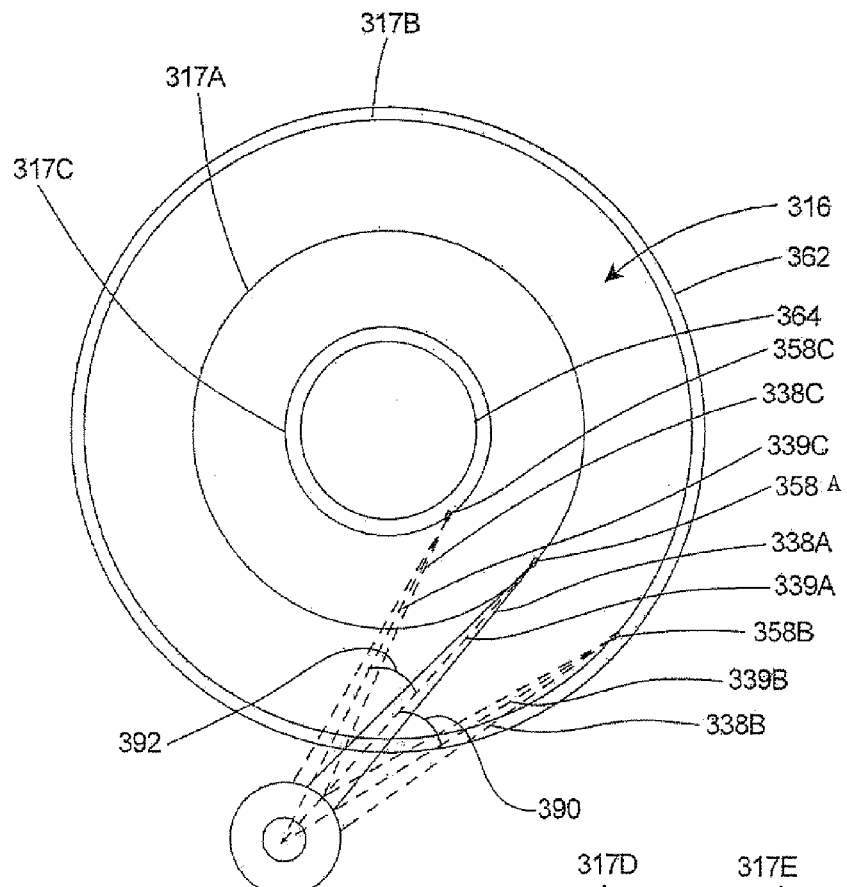
FIG. 3A is a simplified top view of a storage disk and an actuator arm illustrated at three different skew angles.

FIG. 3A is a simplified representation of a portion of a disk drive illustrating three different positions of an actuator arm 338A-C relative to the storage disk 316. The orientation of the actuator arm 338A-C relative to the storage disk 316 is also referred to herein as the skew angle. For example, at a zero skew angle, a longitudinal axis 339A of the actuator arm 338A in a first position forms a line tangent to a first track 317A at the point of track following by a read/write head 358A. Thus, when the read/write head 358A is positioned over the first track 317A, the actuator arm 338A is at the zero skew angle.

The actuator arm 338B is positioned at a positive skew angle 390 when the actuator arm 338B moves away from zero skew toward the outer diameter 362 of the storage disk 316. FIG. 3A shows the actuator arm 338B (in phantom) in a second position with the read/write head 358B positioned at a positive skew angle 390 over a second track 317B. Thus, a longitudinal axis 339B of the actuator arm 338B in a second position forms a line tangent to a second track 317B at the point of track following by the read/write head 358B.

The actuator arm 338C is positioned at a negative skew angle 392 when the actuator arm 338C moves away from zero skew toward an inner diameter 364 of the storage disk 316. FIG. 3A illustrates the actuator arm 338C (in phantom) in a third position with the read/write head 358C positioned at a negative skew angle 392 over a third track 317C. Thus, a longitudinal axis 339C of the actuator arm 338A in a third position forms a line tangent to a third track 317C at the point of track following by the read/write head 358C. The range of skew angles 390, 392 can vary depending upon the design requirements of the disk drive.

Figure 3B:
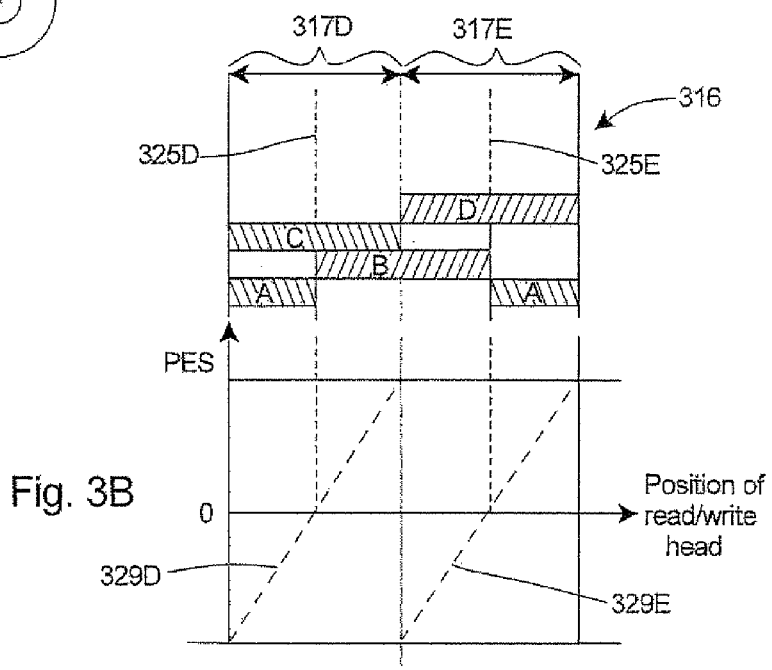
FIG. 3B is a representation of a portion of a first track and an adjacent second track of a storage disk in relation to a position error signal.

FIG. 3B is a representation of a portion of a first track 317D and an adjacent second track 317E of a storage disk 316, along with a graph of position error signal (PES) as a function of positioning of the read/write head. One method of determining the positioning accuracy of the read/write head relative to a centerline 325D of the first track 317D, for example, is by monitoring a PES variance (also sometimes referred to herein as "modulation"). The PES (illustrated by dashed line 329D) is a voltage signal having an amplitude having an absolute value that generally increases as the read/write head moves further off the centerline 325D of the first track 317D.

In one embodiment, changes between head-to-disk contact and non-head-to-disk contact can be determined by monitoring the PES variance at certain designated tracks (such as tracks 317D and 317E illustrated in FIG. 3B) on the storage disk 316. The PES variance method essentially includes monitoring changes in the PES as increasing power levels or decreasing power levels are directed to the slider mover. For example, while increasing the power level, once the PES deviates by a predetermined amount from the PES that occurs during non-head-to-disk contact, head-to-disk contact can be assumed or definitively determined to have occurred. Conversely, in the embodiment that uses a decreasing power level, once the PES deviates by a predetermined amount from the PES during head-to-disk contact, non-head-to-disk contact can be assumed or definitively determined to have occurred, as explained in greater detail below.

In one embodiment, the PES 329D can be derived from one or more servo burst patterns A-D positioned at fixed offsets from the centerline 325D of a the first track 317A. Typically, the PES 329D is received by the drive circuitry, and this information can be used to adjust the positioning of the read/write head relative to the centerline 325D of the first track 317D. As used herein, the first track 317D and the second track 317E can be representative of any track on the storage disk 316.

Normally, when head-to-disk contact occurs at certain skew angles, a sudden change of direction of a force at the actuator arm occurs. Stated another way, actual head-to-disk contact results in an increase in the likelihood that the read/write head will suddenly move away from a centerline 325D, 325E of the track 317D, 317E being followed.

For example, when the slider assembly is positioned near the inner diameter of the storage disk 316, because of the rotation of the storage disk 316 in relation to the negative skew angle, head-to-disk contact causes the slider assembly to suddenly move off-track in an outwardly direction. On the other hand, when the slider assembly is positioned near the outer diameter of the storage disk 316, because of the rotation of the storage disk 316 in relation to the positive skew angle, head-to-disk contact causes the slider assembly to suddenly move off-track in an inwardly direction. Rotation of the storage disk 316 in an opposite direction can yield results opposite from those provided above. This sudden movement of the slider assembly is detected by the servo system as a change and/or increase in the amplitude of the PES, which is detected very shortly after the sudden movement. For instance, the time constant of a PES change following head-to-disk contact can be on the order of approximately 0.3 milliseconds or less.

Stated another way, if the amplitude of the PES is a predetermined level greater than what would normally be expected at a given skew angle during track following by the read/write head, the likelihood that head-to-disk contact has occurred is increased. Generally, the greater the deviation in PES from the PES values expected during track following, the higher the confidence level is that head-to-disk contact has actually occurred. For example, if the PES exceeds the expected PES values at a given skew angle by at least a predetermined percentage, head-to-disk contact can be assumed with a relatively high degree of certainty. Alternatively, if the PES exceeds the expected PES values at a given skew angle by a greater predetermined percentage, the occurrence of head-to-disk contact can be definitively established. An evaluation and/or monitoring of PES to determine head-to-disk contact can include monitoring mean PES, peak PES, peak-to-peak PES, changes in PES and/or any other suitable PES criteria.

The specific skew angles that can be used for determining head-to-disk contact by monitoring PES variance can be varied. In one embodiment, the PES can be monitored and used to determine head-to-disk contact at any skew angle. Alternatively, this type of PES monitoring to assess head-to-disk contact can be used at non-zero skew angles, which can increase PES variance. Still alternatively, this type of PES monitoring to determine head-to-disk contact can be used at skew angles of greater than approximately positive one degree, and/or less than approximately negative one degree. In another embodiment, this type of PES monitoring to determine head-to-disk contact can be used at skew angles of greater than approximately positive five degrees, and/or less than approximately negative five degrees. It is recognized that deviations in the actual PES values from the expected PES values generally increases as the skew angle moves further from zero skew. Thus, with this method, head-to-disk contact can be more definitively determined the further from zero skew the actuator arm is positioned, e.g. more toward the inner or OD of the storage disk 316.

In certain embodiments, the expected PES values and the percentage of variance from such values required to determine a change between head-to-disk contact and non-head-to-disk contact (in either direction) within a specific degree of certainty can be statistically or algorithmically calculated. Alternatively, the expected PES values and the percentage of variance from such values required to determine a change between head-to-disk contact and non-head-to-disk contact within a specific degree of certainty can be established through experimental testing.

In one embodiment, depending upon the skew angle, if the deviation of PES values from the PES values during track following is at least approximately 10%, head-to-disk contact can be assumed to have occurred. In alternative non-exclusive embodiments, depending upon the skew angle, if the deviation of PES values from the PES values during track following is at least approximately 1%, 5%, 20%, 30%, 40%, 50%, 75%, or 100%, the occurrence of head-to-disk contact can be assumed at a particular confidence of less than or up to 100%.

The PES can be monitored at varying levels of current or power directed to the slider mover, and thus, at varying amounts of power output of the slider mover. Further, the PES can be monitored at different skew angles. For example, at a given skew angle, the PES can first be monitored at a relatively low level of current, or when no current is directed to the slider mover. The current can be incrementally or otherwise gradually increased to lower a portion of the slider assembly toward the storage disk to decrease the head-to-disk spacing. The PES is monitored at each current level. Alternatively, as varying levels of current are applied to the slider mover, the PES can be monitored as a function of the power output of the slider mover.

As explained previously, as current to the slider mover is increased, the power output of the slider mover increases, causing a portion of the slider assembly near the read/write head to thermally expand toward the storage disk. However, at a certain current level directed to the slider mover, thermal expansion results in head-to-disk contact. At this point, a deviation from the expected PES value can be determined by the drive circuitry. Depending upon the extent of the deviation from the normal PES curve, a specific confidence level that head-to-disk contact has occurred can be established. By performing this type of monitoring process at various skew angles, the confidence level of head-to-disk contact at a given percentage of variance from the expected PES curve can effectively be increased.

Figure 3C:
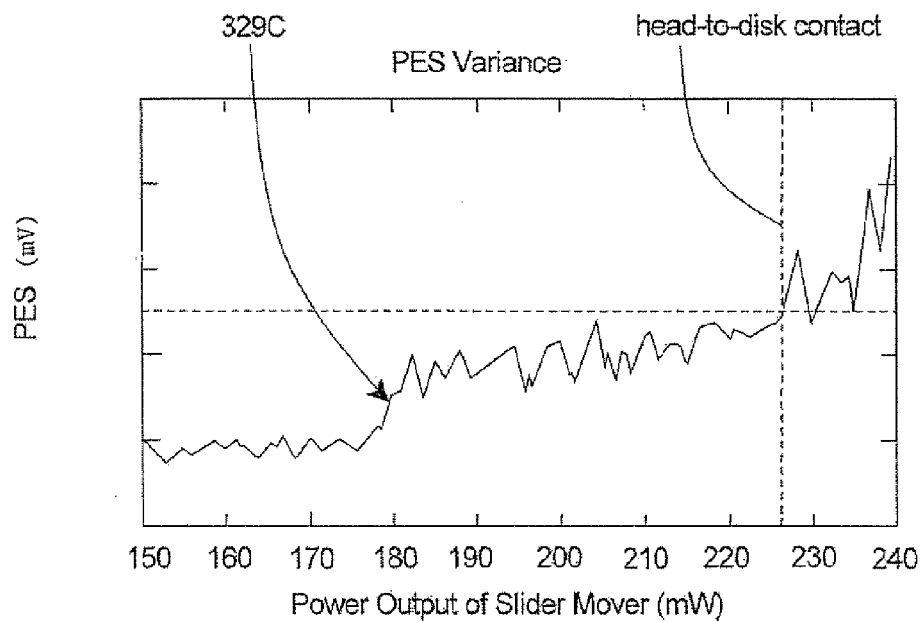
FIG. 3C is a graphical representation of the position error signal as a function of time, while alternately turning current on and off to the slider mover.

FIG. 3C is a graphical representation of PES 329C as a function of power output of the slider mover resulting from current directed to the slider mover by the drive circuitry. As the power output of the slider mover gradually increases, the change in PES 329C can be expected to be substantially linear or somewhat gradual. However, at a certain threshold point, the PES 329C increases significantly, indicating that the read/write head has moved away from the centerline of the track being followed. This significant change in PES 329C indicates that head-to-disk contact has occurred.

Thus, during manufacture and/or testing of a given disk drive, the level of current directed to the slider mover that will likely cause head-to-disk contact can be determined for any given slider assembly at any suitable skew angle. Further, during manufacture and/or testing, the level of current that will result in head-to-disk contact at various times during operation of the disk drive can be determined. For example, this information can be used in order to reduce the likelihood of unwanted head-to-disk contact during a read operation, a write operation or other types of operations, as examples.

Alternatively, or in conjunction with the above embodiment, head-to-disk contact can be detected using a synchronous PES method. As an overview, the synchronous PES method includes monitoring the modulation of the PES at various rotational locations on the storage disk, and is based on the specific frequency of rotation of the storage disk.

In one embodiment using the synchronous PES method, the PES can be monitored at any non-zero skew angle. In an alternative embodiment, the PES can be monitored at any skew angle having an absolute value of greater than approximately 1 degree. In another embodiment, the PES can be monitored at any skew angle having an absolute value of greater than approximately 5 degrees.

Using the synchronous PES method, monitoring of the PES is associated with the frequency of rotation of the storage disk. Because the rotation rate of the storage disk in the disk drive is known, in one embodiment, current to the slider mover to cause thermal expansion of the slider assembly can be turned on and off, or increased and decreased, based on this rotation rate. For example, at a particular skew angle, a specific level of current can be directed to the slider mover to cause thermal expansion of the slider assembly during every other revolution of the storage disk.

The duration of directing current to the slider mover can be approximately equal to the time required for the storage disk to rotate one complete revolution. For instance, in a disk drive having a storage disk that rotates at 7,200 revolutions per minute (120 Hz), the duration of each revolution is 1/120 of a second. Therefore, in this embodiment, the duration of current being directed to the slider mover is also 1/120 of a second, lasting for one complete revolution. In one embodiment, the current to the slider mover can then be arrested for 1/120 of a second (the next revolution of the storage disk). Thus, the current to the slider mover commences once every 1/60 of a second, and lasts for 1/120 of a second before the current is arrested for 1/120 of a second. This cyclic process can be repeated any number of times in succession, or with a time lag between such cycles.

Figure 3D:
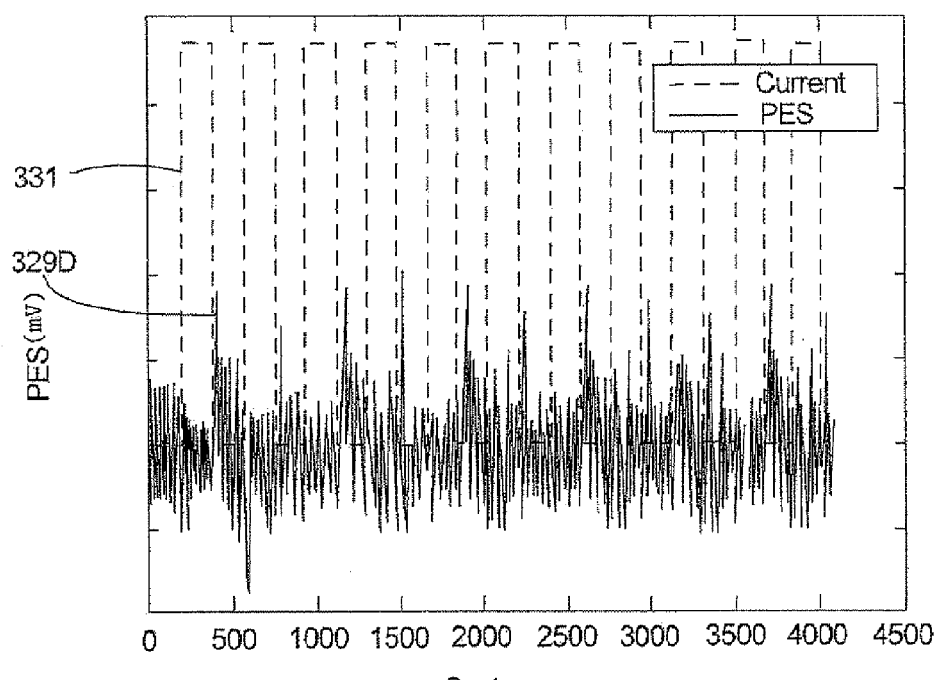
FIG. 3D is a graphical representation of the position error signal as a function of time, while alternately turning current on and off to the slider mover.

FIG. 3D is a graphical representation of the PES 329D as a function of time, while alternately turning current on and off to the slider mover. The current to the slider mover is illustrated by a square wave shown by dashed line 331. In FIG. 3D, time is measured by the number of servo sectors that are read by the read head. In this embodiment, each rotation of the storage disk includes reading approximately 200 servo sectors. Thus, in the embodiment represented by the graph in FIG. 6A, current is repeatedly directed to the slider mover for one complete revolution, then not directed to the slider mover for one complete revolution.

FIG. 3D illustrates that the amplitude of the PES 329D spikes immediately following a change in directing current to the slider mover. For example, when current to the slider mover is turned on, a nearly immediate spike in the amplitude of the PES 329D is detected. Moreover, when the current to the slider mover is turned off, a nearly immediate spike in the amplitude of the PES 329D in the opposite direction is detected. The spikes in the amplitude of the PES 329D which are detected by the servo system are attributable to one of two sudden changes: (1) head-to-disk contact has just occurred, or (2) the read/write head has just withdrawn from contact with the storage disk. Following each such spike, the servo system can adjust the positioning of the slider assembly, and thus the read/write head, which causes the amplitude of the PES 329D to diminish until the next change in directing current to the slider mover occurs at the predetermined interval, in this example.

Figure 3E:
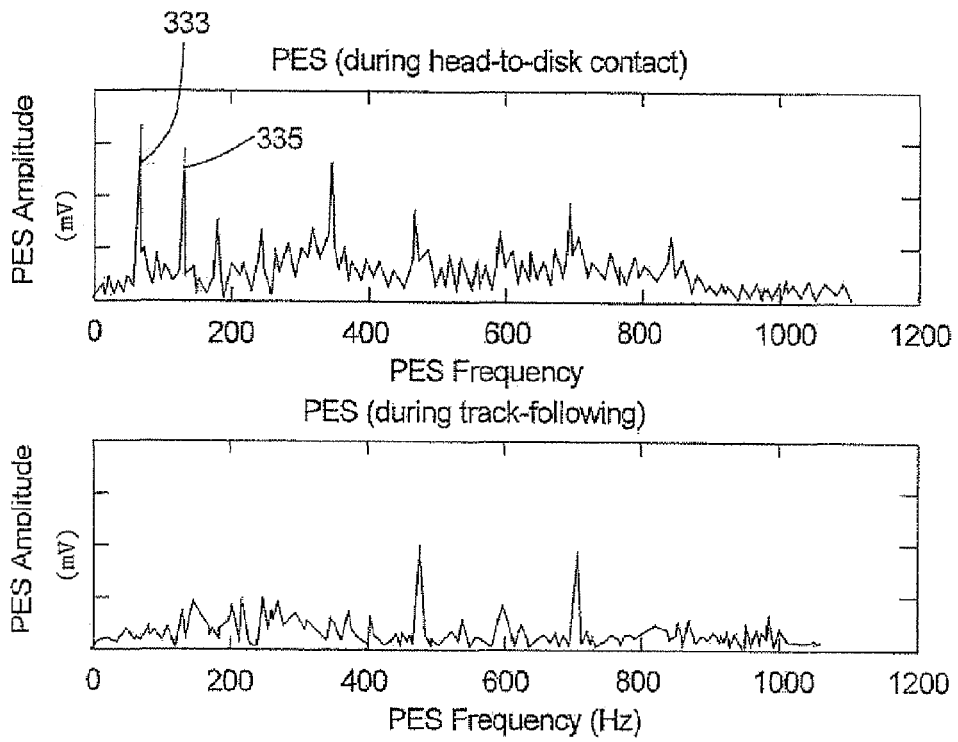
FIG. 3E is a graphical comparison of the amplitude of the position error signal as a function of the frequency of the position error signal, both during head-to-disk contact and during track following.

FIG. 3E illustrates graphical comparisons of the amplitude of the PES as a function of the frequency of the PES, both during head-to-disk contact and during track following. As shown in the upper graph in FIG. 3E, during head-to-disk contact, a spike 333 in the amplitude of the PES occurs at approximately 60 Hz because this is the fundamental frequency in this example. Stated another way, in this embodiment, current is directed to the slider mover once approximately every 1/60 of a second (for a duration of 1/120 of a second). Further, as explained above, a spike 335 in the amplitude of the PES occurs at a frequency of approximately 120 Hz because the drive circuitry is alternately turning directing current and arresting current to the slider mover every 1/120 of a second. The harmonics of this system also cause short duration increases in the amplitude of the PES that continually diminish as the frequency increases beyond 120 Hz.

The lower graph in FIG. 3E illustrates that during track following, relatively little PES activity occurs at lower frequencies such as the fundamental frequency, and multiples of the fundamental frequency. In other words, the spikes 333, 335 in amplitude observed in the upper graph in FIG. 3E are not observed during track following. However, at somewhat higher frequencies, i.e. 240 Hz, 480 Hz, and 720 Hz, etc., relatively small increases in the amplitude of the PES do occur. Because the frequencies of these increases in the PES are several multiples higher than the fundamental frequency, and are similar to the increases observed in the upper graph in FIG. 3E at those same frequencies, such increases in amplitude are attributable to causes other than head-to-disk contact, e.g., causes related to disk rotation such as disk wobble, spindle motor noise, etc.

By repetitiously and consistently comparing PES with current to the slider mover alternately being turned on and off, extraneous noises that are unrelated to head-to-disk contact can basically be discounted or disregarded, leaving behind a relatively unique PES frequency pattern. This PES frequency pattern can be attributable to the occurrence of head-to-disk contact. With this design, because extraneous noise has effectively been removed from the analysis, the signal to noise ratio is increased, providing a more accurate determination of the timing of the onset of head-to-disk contact.

As used herein, convergence time is the point in time at which a definitive determination of head-to-disk contact occurs. Once the unique PES frequency pattern is identified, a single point method could be applied to speed up the convergence time of the sine and cosine coefficients as shown in the following equations:

$$B = \frac{2}{N\_HSEC \cdot REV} \sum_{i=1}^{REV} \sum_{k=0}^{2N-1} y(k)\cos\left(\frac{\pi}{N\_HSEC}k\right) \quad (1)$$

$$A = \frac{2}{N\_HSEC \cdot REV} \sum_{i=1}^{REV} \sum_{k=0}^{2N-1} y(k)\sin\left(\frac{\pi}{N\_HSEC}k\right)$$

where REV is an even number. Since only the amplitude in the synchronous PES method is important, the onset of head-to-disk contact can be determined by $A^2+B^2$ from equation 1 above.

Figure 3F:
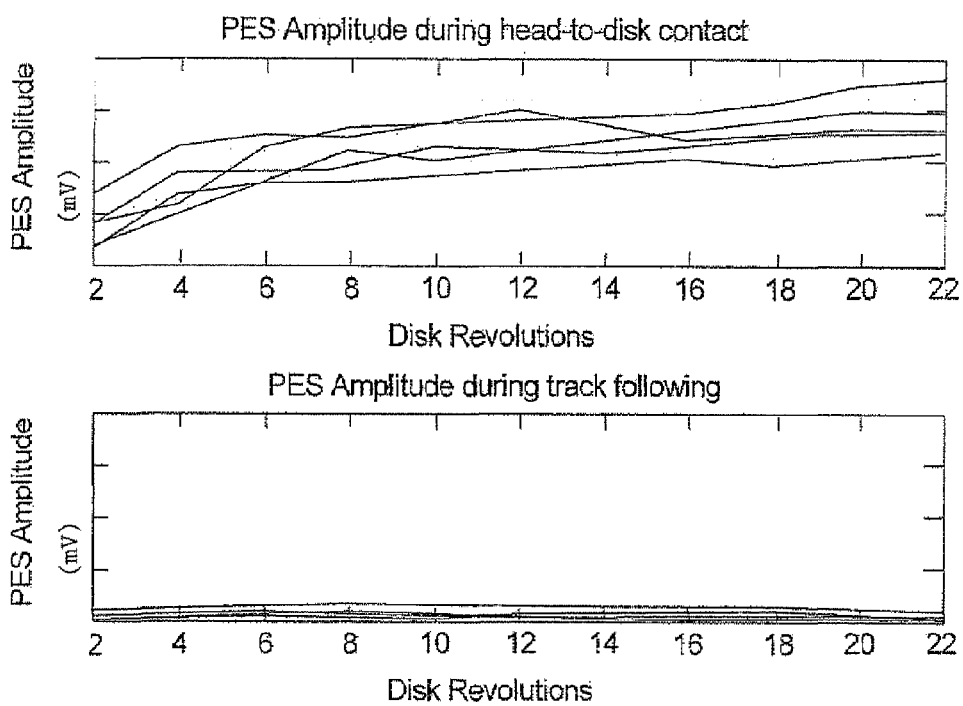
FIG. 3F is a graphical comparison of a convergence time for the amplitude of the position error signal as a function of revolutions of the storage disk, both during head-to-disk contact and during track following.

FIG. 3F graphically illustrates the convergence time of the amplitudes of the PES (upper graph in FIG. 3F), which occurs at approximately 20 revolutions. As used herein, the convergence time is the time (measured in number of revolutions of the storage disk) at which the amplitude of the PES levels off and remains relatively consistent. For example, in a disk drive having a storage disk that rotates at approximately 7,200 revolutions per minute, 20 revolutions translates to approximately one-sixth of a second. However, the amplitudes of the PES during track following (lower graph in FIG. 3F) are relatively small compared to the amplitudes of the PES during even the first several revolutions following directing current to the slider mover. Thus, as shown in the upper graph in FIG. 3F, in some embodiments, head-to-disk contact can be detected before 20 revolutions of the storage disk have occurred.

For example, in one embodiment, if the amplitude of the PES is a predetermined percentage larger than the PES during track following, the drive circuitry can determine that head-to-disk contact has occurred within as few as approximately two revolutions of the storage disk, or within approximately $\frac{1}{60}$ of a second. In another embodiment, the amplitude of the PES can be large enough for the drive circuitry to determine that head-to-disk contact has occurred within as few as approximately four revolutions, or within approximately $\frac{1}{30}$ of a second.

Further, in one embodiment of the synchronous PES method, at a given skew angle head-to-disk contact is determined to have occurred when the amplitude of the PES is at least approximately 10% greater than the amplitude of the PES during track following. In alternative non-exclusive embodiments, head-to-disk contact is determined to have occurred when the amplitude of the PES is at least approximately 1%, 5%, 20%, 50%, 100%, 200%, 300%, 400% or 500% greater than the amplitude of the PES during track following. An evaluation and/or monitoring of PES to determine head-to-disk contact can include monitoring mean PES, peak PES, peak-to-peak PES, changes in PES and/or any other suitable PES criteria.

Figure 3G:
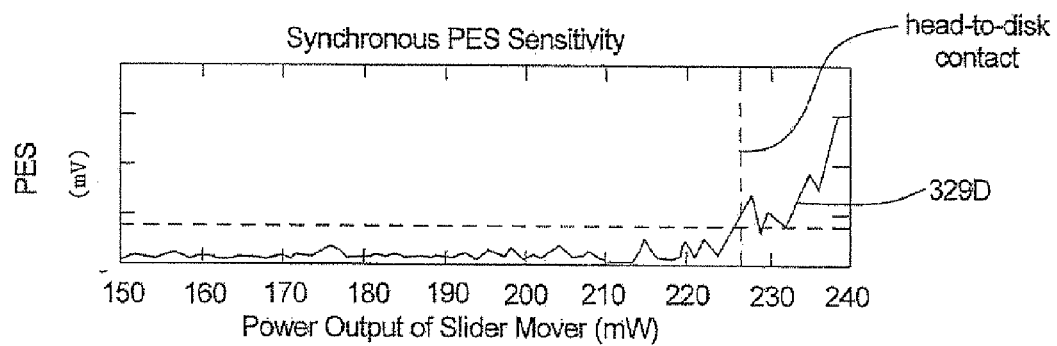
FIG. 3G is a graphical representation of the relationship between power output of the slider mover and the amplitude of the position error signal.

FIG. 3G is a graph showing the relationship between power output of the slider mover and the amplitude of the PES 329D. FIG. 3G illustrates that once a relatively low threshold of PES amplitude has been exceeded, head-to-disk contact can be determined to have occurred. In this example, as power output of the slider mover increases up to approximately 220 mW, relatively little change in a baseline PES amplitude occurs, indicative of no head-to-disk contact. However, at a level of between approximately 220-230 mW, a substantial increase in the PES amplitude as a function of percentage greater than baseline occurs. This easily noticeable increase in PES amplitude provides an early detection of head-to-disk contact. With this design, fewer revolutions of the storage disk are required to accurately ascertain the moment of head-to-disk contact, resulting in a decreased likelihood of damage to the slider assembly and/or the storage disk.

Using the synchronous PES method described herein, the change in positioning of the read/write head relative to the centerline of the track can be consistently analyzed because head-to-disk contact is repeatedly occurring at substantially the same location on the storage disk. Further, withdrawal of the read/write head from contact with the storage disk is also repeatedly occurring at substantially the same location on the storage disk. Because the extraneous noise is reduced, an accurate analysis can be performed by the drive circuitry to determine the moment of head-to-disk contact. With this design, a zero reference point, e.g. head-to-disk spacing equals 0 nm, is more precisely defined, which allows the drive circuitry to more accurately determine and adjust the in situ head-to-disk spacing.

In an alternative embodiment, current to the slider mover can be timed so that the current cyclically starts, stops and starts again at some multiple of the fundamental frequency of the storage disk, i.e. at 4.0, 2.0, 0.5, 0.25, 0.125, etc., times the fundamental frequency. For example, the current can be directed and arrested to the slider mover at a rate that is faster than the rotation rate of the storage disk, such as every $\frac{1}{120}$ of a second for $\frac{1}{240}$ of a second. In this embodiment, the storage disk rotates approximately one-half of a revolution while the current to the slider mover is on, and the next one-half of a revolution while the current to the slider mover is off. This cycle is repeated as many times as necessary.

In another embodiment, the current directed to the slider mover can be turned on at a rate that is slower than the rotation rate of the storage disk, such as every $\frac{1}{30}$ of a second for $\frac{1}{60}$ of a second. In this embodiment, the storage disk rotates approximately two revolutions while the current to the slider mover is on, and the next two revolutions while the current to the slider mover is off, repeating as necessary. In still an alternative embodiment, the cyclic on/off directing of current to the slider assembly can be unrelated to the rotation rate of the storage disk, provided the timing of the "on" cycle is relatively consistent.

The location of head-to-disk contact and the location of withdrawal of head-to-disk contact can be substantially the same location on the storage disk, or the location of head-to-disk contact and the location of withdrawal of head-to-disk contact can be different. Accordingly, a consistent portion of the designated track or tracks are used for determining head-to-disk contact, which can provide more accurate results. Moreover, using the synchronous PES method, current directed to the slider mover repeatedly occurs when the read/write head is positioned in substantially the same location relative to a revolution of the storage disk. Stated another way, head-to-disk contact can be repetitiously analyzed over substantially the same disk topography rather than attempting to analyze PES to determine head-to-disk contact at random and changing locations on the storage disk.

In still another embodiment, changes between head-to-disk contact and non-head-to-disk contact can be detected using a null current (also sometimes referred to as a "Null-I") method. The approximate moment in time of a change between head-to-disk contact and non-head-to-disk contact can be determined by monitoring at least a portion of the current directed toward the actuator motor 34 (illustrated in FIG. 1) which is based on servo information received by the drive circuitry. This current is the manifestation of the Null-I code in the firmware of the drive circuitry instructing the actuator motor 34 to compensate for off-track movement of the slider. In other words, this current is used to adjust the positioning of the read/write head relative to one or more designated tracks (such as tracks 317D and 317E illustrated in FIG. 3B) on the storage disk 316. In this embodiment, when the position error signal has exceeded a predetermined threshold level, the drive circuitry directs current to the actuator motor 34 to compensate for any off-track movement (which is reflected in a PES spike) to drive the PES toward zero and maintain the PES as close to zero as possible.

In this embodiment, monitoring the current directed toward the actuator motor 34 as a result of servo signals such as PES can result in a more steady-state observation over a period of time, i.e. $\frac{1}{120}^{th}$ of a second, $\frac{1}{240}^{th}$ of a second, $\frac{1}{60}^{th}$ of a second, or other multiples or fractions of the fundamental frequency. Stated another way, the current directed toward the actuator motor 34 adjusts the position of the read/write head, and maintains this positioning until a further change in PES occurs, at which point the current is readjusted and maintained.

Figure 3H:
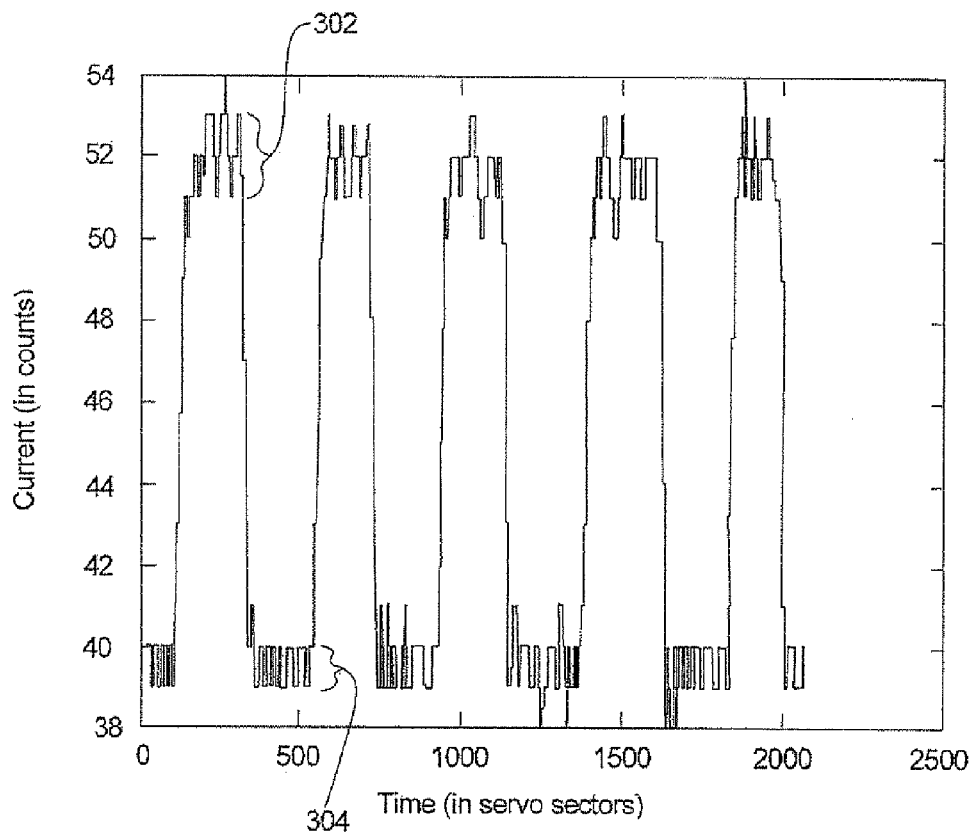
FIG. 3H is a graphical representation of the relationship between current to an actuator motor of the disk drive caused by changes in position error signal as a function of time.

FIG. 3H is a graphical representation of current directed toward the actuator motor 34 as a result of PES information received by the drive circuitry as a function of time for a given level of power that is alternately turned on and off to the slider mover 200 (illustrated in FIG. 2A). In FIG. 3H, time is measured by the number of servo sectors that are read by the read head. In this embodiment, each rotation of the storage disk includes reading approximately 200 servo sectors. Thus, in this example, the power to the slider mover 200 is alternately on for approximately $\frac{1}{120}^{th}$ of a second (approximately 1 revolution of the storage disk) and off for approximately $\frac{1}{120}^{th}$ of a second.

The current directed toward the actuator motor 34 to adjust for changes in PES is at least partially determined by an integrator signal that resides in the firmware of the disk drive. Stated another way, in this embodiment, the current directed toward the actuator motor 34 is basically an integrated output of the PES. Each "count" of the integrator signal corresponds to a predetermined level of current that is directed to the actuator motor 34. For example, in one embodiment, each count of the integrator signal equals approximately 55 microamps of current, although the level of current per count can vary. The resultant current to the actuator motor 34 is substantially a square wave, representing more of a steady-state level.

Although FIG. 3H illustrates an example where the timing is somewhat similar to the synchronous PES embodiment previously described, it is recognized that such alternating on/off timing is not required for the null current method. Stated in another manner, because the current to the actuator motor is relatively constant following a change in PES over a designated track until another change in PES occurs, the current provides a unique signature for the drive circuitry to determine whether or not a change between head-to-disk contact and non-head-to-disk contact has occurred.

In essence, the current changes between two basic levels based on a bi-directional change in the PES: a first level 302 (illustrated at approximately 51-53 counts in FIG. 3H) that causes a first bias force resulting in rotation of the actuator assembly in a first direction, and a second level 304 (illustrated at approximately 39-40 counts in FIG. 3H) that causes a second bias force resulting in rotation of the actuator assembly in a second direction that is opposite the first direction. If the drive circuitry detects that the read/write head has moved off-track in one direction, current is directed to the actuator motor to rotate the actuator assembly in the opposite direction to bring the PES toward zero. It is recognized that the first level 302 and second level 304 can vary depending upon the design of the disk drive, and that the values of current included in FIG. 3E are provided for representative purposes and ease of discussion only.

In one embodiment, if the deviation between the first level 302 and the second level 304 directed to the actuator motor as a result of the changes in PES is at least approximately 10%, a change in the head-to-disk contact status can be assumed to have occurred. In alternative, non-exclusive embodiments, if the deviation between the first level 302 and the second level 304 directed to the actuator motor as a result of the changes in PES is at least approximately 1%, 5%, 20%, 30%, 40%, 50%, 75%, or 100%, a change in the head-to-disk contact status can be assumed to have occurred at a particular confidence of less than or up to 100%.

By determining the timing of the transition between the first level 302 and the second level 304, and factoring in a time constant to initiate the current to the actuator motor caused by the change in PES information, an accurate determination of the approximate moment of transition between head-to-disk contact and non-head-to-disk contact (in either direction) can be ascertained.

Head-to-disk contact can also be detected by a readback voltage amplitude method. The readback voltage amplitude method includes monitoring the readback voltage amplitude while systematically directing current to the slider mover during rotation of the storage disk. It is understood in the art that the strength of the magnetic field of the storage disk increases exponentially as detected by the read/write head as the head-to-disk spacing decreases linearly. This increase in the magnetic field results in a corresponding, proportional exponential increase in the readback voltage amplitude. In alternative embodiments, the monitoring of readback voltage amplitude can be performed using a variable gain control servo signal (VGAS) or a variable gain control data readback signal (VGAR). Further, the readback voltage amplitude method can be used at any skew angle.

Figure 3I:
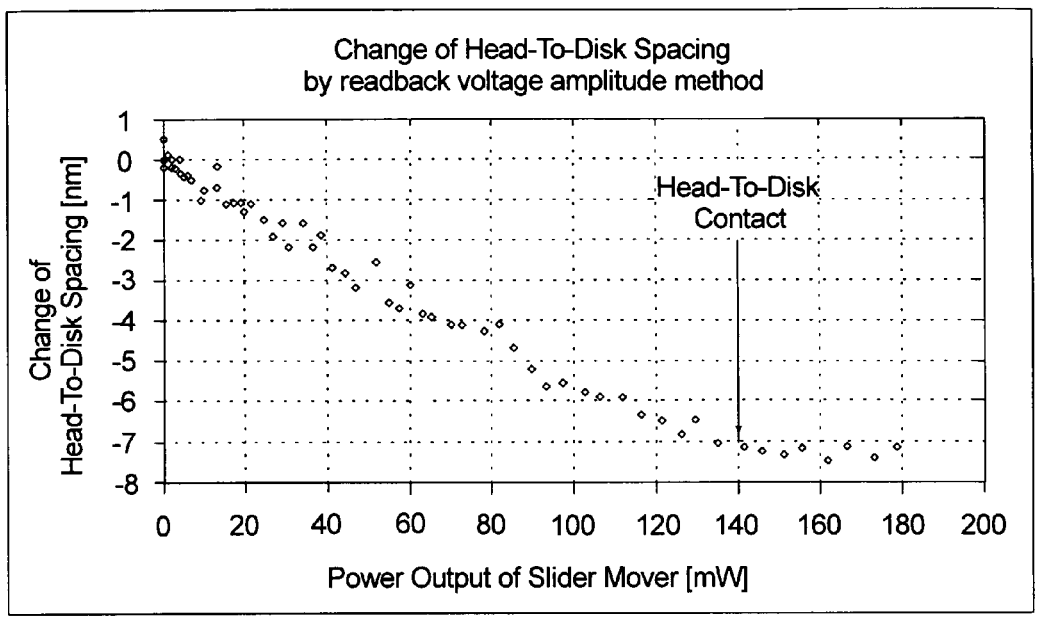
FIG. 3I is a graphical representation of change in head-to-disk spacing as a function of power directed to the slider mover.
Figure 3J:
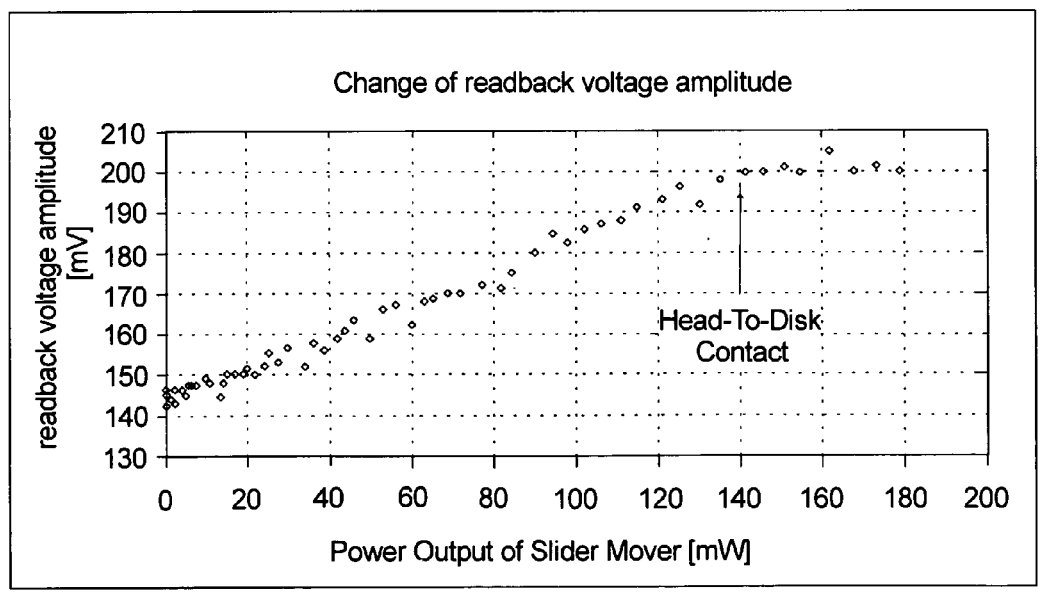
FIG. 3J is a graphical representation of readback voltage amplitude as a function of power directed to the slider mover.

FIGS. 3I and 3J show two related graphs illustrating the relationship between head-to-disk spacing (FIG. 3I) and readback voltage amplitude (FIG. 3J), which is also sometimes referred to as an amplitude of a variable gain amplifier (VGA) signal, as a function of power output of the slider mover. An increase in the level of current to the slider mover causes the power output of the slider mover likewise to increase. As illustrated in FIG. 3I, this increase in power results in a decrease in head-to-disk spacing (shown as an increasingly negative change in head-to-disk spacing) due to the thermal expansion of the slider assembly. Once head-to-disk contact occurs, a further increase in the level of current to the slider mover (and thus the power output of the slider mover) does not result in any further substantial change in the head-to-disk spacing.

As illustrated in FIG. 3J, the increase in power, and thus, the decrease in head-to-disk spacing, results in an increase in the readback voltage amplitude until head-to-disk contact occurs. Consequently, at this point, the readback voltage amplitude likewise does not substantially change, as illustrated by the substantially level section of data points at approximately 200 mV in FIG. 3J.

Therefore, head-to-disk contact can be determined by gradually or incrementally increasing current to the slider mover to increase the power output of the slider mover, and monitoring the readback voltage amplitude. Once the readback voltage amplitude no longer increases with a corresponding increase in current to the slider mover, head-to-disk contact can be determined to have occurred.

Various methods of determining head-to-disk contact are described in co-pending U.S. patent application Ser. No. 11/101,112, filed by Schreck, et al. on Apr. 7, 2005, and assigned to Maxtor Corporation, the contents of which are incorporated herein by reference.

Figure 4:
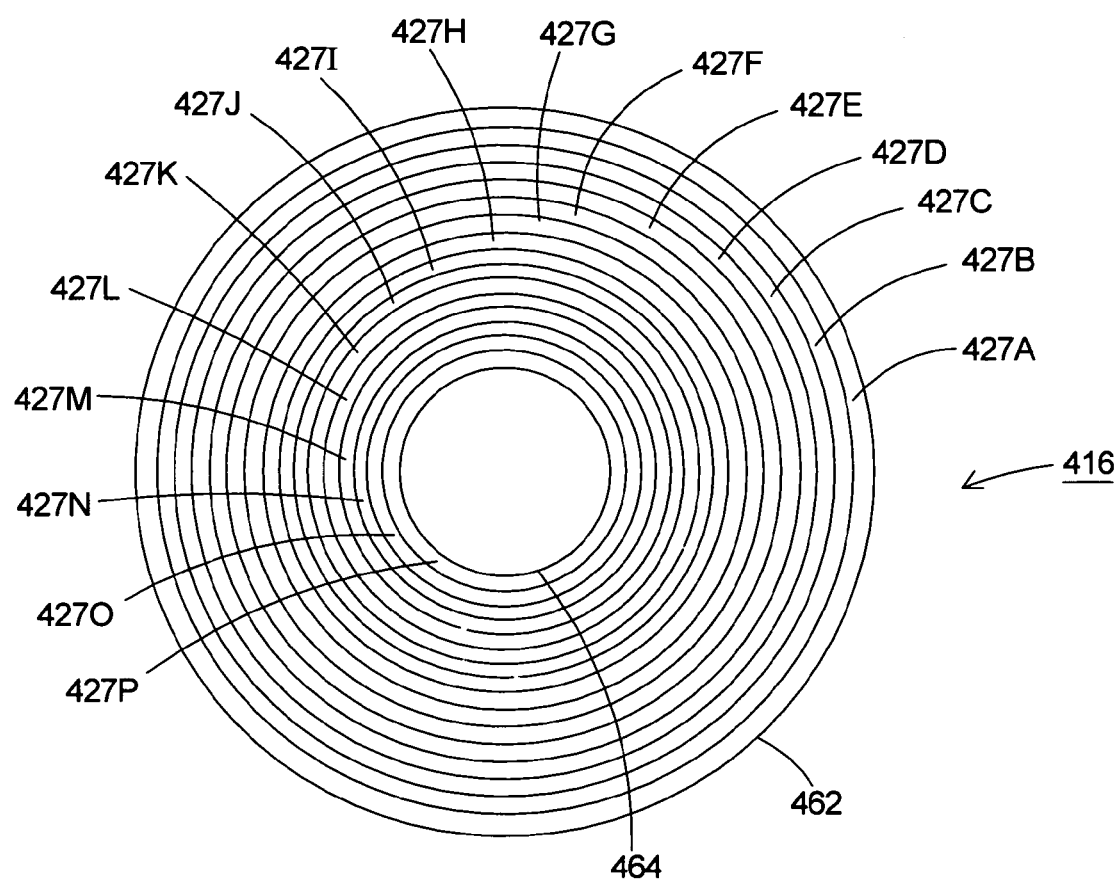
FIG. 4 is a top view of a storage disk illustrating a plurality of disk zones.

FIG. 4 is a top view of a storage disk 416 illustrating a plurality of disk zones 427A-P (also referred to simply as "zones") of varying radii. One or more specific zones on the storage disk 416 can be used for monitoring and detecting head-to-disk contact, and for calibrating head-to-disk spacing. As the position of the slider changes in a radial direction, different factors can cause a change in head-to-disk spacing, including the configuration of the slider and the velocity of the storage disk, as non-exclusive examples. Moreover, these same factors can cause a change in head-to-disk spacing as the slider moves radially relative to the storage disk, such as during a seek operation. The head-to-disk spacing can also be influenced by the velocity, acceleration and/or deceleration of the slider in the radial direction.

Consequently, in one embodiment, the determination of head-to-disk contact can be performed at a plurality of zones, with each zone including one or more designated tracks. These designated tracks can be designed for allowing head-to-disk contact, and such tracks typically do not contain data which could otherwise be lost. Alternatively, the designated tracks can be standard data tracks or servo tracks, as non-exclusive examples. In one embodiment, three zones can be used. In this embodiment, the three zones include an outer zone 427A located near the outer diameter 462, an inner zone 427P located near the inner diameter 464, and a middle zone 427E located between the outer zone 427A and the inner zone 427P.

The data from these three zones 427A, 427E, 427P can be interpolated for the other zones of the storage disk 416 positioned adjacent to or between these zones 427A, 427E, 427P so that the occurrence of head-to-disk contact in these other zones can be determined and eventually used by the drive circuitry to monitor and/or adjust head-to-disk spacing. The interpolation can be substantially linear or it can incorporate some other suitable non-linear algorithm or formulae. Depending upon the location of the selected zones 427A-P, extrapolation can be used in addition to or alternative to interpolation.

Alternatively, the determination of head-to-disk contact can be performed on designated tracks in greater or fewer than three zones. For example, in another embodiment, head-to-disk contact can be determined in 16 different substantially concentric zones positioned between the ID and the OD of the storage disk 316, although the precise number of zones can vary.

Once relatively consistent head-to-disk contact has been detected using any of the methods described herein, for a given skew angle, the drive circuitry can measure, calculate or otherwise determine the amplitude of the variable gain amplifier signal for a read channel (VGAR) or a servo channel (VGAS). These signals are also sometimes referred to generically either as VGA signals or as readback voltage amplitudes. Further, VGA signals for head-to-disk contact can be determined at varying skew angles.

Once VGA signals for heid-to-disk contact have been determined in a plurality of zones and/or on a plurality of tracks on the storage disk, these zero-clearance references can be "mapped" by interpolation and/or extrapolation, and can be stored by the drive circuitry for use during monitoring and/or adjusting of head-to-disk spacing. With this design, expected VGA signals at a head-to-disk spacing of 0 nm can be determined and/or stored for any radial position on the storage disk. For example, these expected VGA signals can be stored in a look-up table in the memory or firmware of the disk drive.

In one embodiment, from this zero clearance reference, power to the slider mover can be decreased in increments or in an otherwise predetermined manner to raise the read/write head off of the disk surface to increase the actual head-to-disk spacing. Based on a change in the VGA signal, the actual head-to-disk spacing can be calculated and calibrated for varying levels of power to the slider mover based on the change in amplitude of the VGA signal and/or the radial position over the storage disk, as described herein. It is recognized that other known methods of increasing or otherwise changing the actual head-to-disk spacing can be used during this calibration process. However, for consistency and ease of discussion, adjustment of the actual head-to-disk spacing is described herein through use of the slider mover.

In order to determine the actual head-to-disk spacing, once the zero-reference has been established, the Wallace Spacing Loss equation can be utilized. One form of the basic Wallace Spacing Loss equation is as follows:

$$A = C^* e^{(-2\pi dF/v)},$$

where A=rack amplitude; C=is an unknown constant; F=fundamental frequency of the data pattern; v=velocity of the read/write head relative to the storage disk; and d=magnetic spacing (also referred to herein as "head-to-disk spacing"). Note that the constant, C, is not dependent on d but is dependent upon F and v.

Thus, in terms of VGA, the drive circuitry can use one or more algorithms to accurately determine actual head-to-disk spacing as a function of VGA, as follows:

$$A = C^* e^{(-2\pi dF/v)} \qquad [1]$$

$$\log(A) = \log(C) - \log(e)(2\pi dF/v) \qquad [2]$$

In one embodiment, $$(20*256/24)\log(A) = (20*256/24)\log(C) - \log(e) \\ (20*256/24)(2\pi dF/v) \qquad [3]$$

$$VGA = (20*256/24)\log(C) - \log(e)(20*256/24)(2\pi dF/v) \qquad [4]$$

In-order to remove the term involving the unknown C, measurements can be taken at two different values of actual head-to-disk spacing that are referred to herein as $d_0$ and $d_1$.

$$VGA[d_1] = (20*256/24)\log(C) - \log(e)(20*256/24) \\ (2\pi d1 F/v) \qquad [5]$$

$$VGA[d_0] = (20*256/24)\log(C) - \log(e)(20*256/24) \\ (2\pi d0 F/v) \qquad [6]$$

$$VGA[d_1] - VGA[d_0] = -\log(e)(20*256/24)(2\pi F/v)(d_1 - d_0) \qquad [7]$$

In working up this data, do is set to the magnetic spacing when current to the slider mover=0, also referred to as a non-contact level of current ($RSS_0$). Further, $d_1$ represents the magnetic spacing when current to the slider mover is at a value of greater than 0, also referred to as a contact level of current ($RSS_1$). It follows that ($d_1$-$d_0$) is the change in actual head-to-disk spacing caused by the change between the contact level of current and the non-contact level of current.

$$VGA[RSS_1] - VGA[RSS_0] = -\log(e)(20*256/24)(2\pi F/v) \\ (FHA[RSS_1]), \qquad [8]$$

where $FHA[RSS_1]$ is the fly height adjust actuation at the non-contact level of current to the slider mover.

If $\Delta VGA[RSS_1]$ is $VGA[RSS_1] - VGA[RSS_0]$, then:

$$\Delta VGA[RSS_1] = -\log(e)(20*256/24)(2\pi F/v)(FHA \\ [RSS_1]) \qquad [9]$$

$FHA[RSS_1]$ is then calculated from the measured $\Delta VGA[RSS_1]$ as follows:

$$FHA[RSS_1] = ((24*\ln(10)*v)/(20*256*2\pi F))\Delta VGA \\ [RSS_1] \qquad [10]$$

Using this equation each test track or any other track can be used to independently measure $FHA[RSS_1]$. The measurements would substantially agree with one another at least within the noise level of the measurement.

Following the Wallace Spacing Loss equation, equation [9] provides for two other methods of extracting $FHA[RSS_1]$ from the dataset. $FHA[RSS_1]$ can be obtained from the slope of $\Delta VGA[RSS_1]$ plotted versus F at constant v or from the slope of $\Delta VGA[RSS_1]$ plotted versus 1/v at constant F. Both of these plots ideally are linear with zero intercept.

The two methods of slope based $FHA[RSS_1]$ calculation can be simplified by defining two new quantities that are referred to herein as frequency normalized VGA (fnVGA) and velocity normalized VGA (vnVGA). These two quantities are defined herein as follows:

$$vnVGA[RSS_1] = (24*\ln(10)*v)/(2\pi*20*256)\Delta VGA \\ [RSS_1] \qquad [11]$$

$$fnVGA[RSS_1] = (24*\ln(10)*)/(20*256*2\pi F)\Delta VGA \\ [RSS_1] \qquad [12]$$

It then follows from equation [9] that:

$$vnVGA[RSS_1]=FHA[RSS_1]*F \text{ and} \qquad [13]$$

$$fnVGA[RSS_1]=FHA[RSS_1]*(1/v) \qquad [14]$$

Equation [13] can be used to extract a measure of FHA [$RSS_1$] at each of the test locations, with one or more of the test locations having a varying range of frequencies, such as from 50 MHz up to 197.5 MHz, for example.

Equation [14] can be used to extract a measure of FHA [$RSS_1$] using the data written radially across the drive at a series of fixed frequencies having a varying range, such as from 50 MHz up to 197.5 MHz, for example.

In summary, the above equations allow a determination of not only the change in head-to-disk spacing [$d_1-d_0$] following actuation of the read/write head relative to the storage disk, but also allow an accurate determination of the actual head-to-disk spacing [$d_N$] at any given time, and/or any given radial location of any of the read/write heads relative to the corresponding storage disk. Once the zero reference [$d_0$] is determined at any particular location on the storage disk, a corresponding VGA[$d_0$] amplitude is measured, calculated or otherwise determined. In other words, when the actual head-to-disk spacing is 0 nm, the VGA[$d_0$] amplitude is measured, communicated to the drive circuitry and stored. In other words, the VGA[$d_0$] amplitude is known, permitting application of the equations provided above to determine the actual head-to-disk spacing [$d_1$] at an initially unknown head-to-disk spacing.

When the actual head-to-disk spacing increases from 0 nm as a result of any suitable method which can include a decrease in current directed to the slider mover, for example, the VGA amplitude also changes from VGA[$d_0$] to VGA [$d_1$]. This change in VGA, e.g., VGA[$d_0-d_1$], is applied to the Wallace Spacing Loss equations provided above to yield an accurate determination of the actual head-to-disk spacing [$d_1$] at any point in time during operation of the disk drive. It is recognized that this determination can be independently performed for any or all of the read/write heads in the disk drive, and is not limited to any one read/write head.

In one embodiment, VGA measurements can be taken at multiple frequencies and/or multiple radial locations relative to the storage disk. Use of equations [13] and [14] can be used to determine actual head-to-disk spacing. The two frequency form of the head-to-disk spacing measurement is detailed in equation [15], as follows:

$$d_1-d_0=(24*\ln(10)*)/(20*256*2\pi(F2-F_1))(VGA[F2,D1]-VGA[F_1,D_1]+VGA[F_1,D_0]-VGA[F_2,D_1]) \qquad [15]$$

Monitoring of the actual head-to-disk spacing by the drive circuitry can occur periodically at timed intervals during use of the disk drive. Alternatively, monitoring can occur before, during or after certain events, such as at startup, and/or transitions between various operations of the disk drive and/or other designated triggering events. Still alternatively, monitoring of the head-to-disk spacing can occur constantly or on an instantaneous basis.

In addition, once the zero reference has been established, a systematic process can occur that incorporates the methods provided herein to facilitate calibration of the actual head-to-disk spacing of one or more read/write heads. This calibration can be based on one or more of the VGA amplitude signals, the level of power and/or current directed to the slider mover via the drive circuitry, and the radial positioning of the read/write head relative to the storage disk. Further, by using interpolation and/or extrapolation, the calibration of head-to-disk spacing is not limited to certain zones or to areas of the storage disk having designated test tracks.

Once the drive circuitry can determine and/or monitor the actual head-to-disk spacing for a particular read/write head, the specific level of power necessary to invoke a change in the actual head-to-disk spacing can be determined and implemented. For example, once the drive circuitry has determined that the read/write head has an actual head-to-disk spacing of 6 nm, and a desired head-to-disk spacing of 5 nm, by coordination between the drive circuitry and the slider mover, the head-to-disk spacing can be decreased to the desired level. In one embodiment, the power to the slider mover can be increased until the pre-calibrated VGA amplitude is measured by the slider and communicated to the drive circuitry, at which point the power to the slider mover is adjusted to maintain the desired VGA amplitude, and thus, the desired head-to-disk spacing.

In an alternative embodiment, if a decrease in the head-to-disk spacing of 1 nm is desired from the present head-to-disk spacing, the drive circuitry directs a pre-calibrated level of power to the slider mover. In this embodiment, the newly reached head-to-disk spacing can be monitored and/or confirmed by comparing the actual VGA amplitude at one or more frequencies or radii with an expected calibrated VGA amplitude at one or more frequencies or radii. For instance, if a change in head-to-disk spacing from 5 nm to 4 nm has been calculated using the equations provided herein to result in an expected VGA amplitude, the measured VGA amplitude can be compared to this expected VGA amplitude to check the actual head-to-disk spacing. If a significant discrepancy is found, the drive circuitry can change the level of current to the slider mover accordingly, and the VGA amplitude can be checked again. This process can be repeated as necessary to force the actual head-to-disk spacing as close to the desired head-to-disk spacing as practicable.

With this information, as discussed below, the drive circuitry can determine if the head-to-disk spacing is either too small or too great, and can adjust the power level to the slider mover accordingly. Additionally, the power level directed to the slider mover can be coordinated with the timing of a seek operation (or any other drive operation) to more accurately adjust the head-to-disk spacing so that the read/write head is positioned at the appropriate head-to-disk spacing once the read/write head has ultimately arrived at the target track.

A further application of the present invention includes accurately determining the extent of environmental pole tip protrusion (thermal expansion of the write pole tips toward the storage disk caused by an increase in environmental temperature "EPTP") and/or WPTP of any or all of the read/write heads once calibration of the read/write heads relative to each respective storage disk has occurred as provided herein. For example, if a specific known level of power is directed to the slider mover while the drive is relatively cold, a known VGA amplitude is expected. Once the drive heats up, the VGA amplitude can change, even though no change in power to the slider mover has occurred and no write operation is presently taking place. In one embodiment, this change can be attributed to EPTP caused by an overall increase in temperature of the disk drive. The extent of the EPTP, e.g., the specific distance that the read/write head protrudes toward the storage disk, is determined by the drive circuitry based on the change in VGA amplitude, as provided above. In this embodiment, the change in VGA amplitude is not attributable to HtD spacing changes because a constant level of power is being directed, if at all, to the slider mover, and because no writing (thus, no WPTP) is occurring.

Moreover, if a specific known power level is directed to the slider mover once the drive has reached an equilibrium operating temperature but prior to a write operation, a known VGA amplitude is expected. Once a write operation commences, the VGA amplitude can change, even though no change in power to the slider mover has occurred. In one embodiment, this change can be attributed to WPTP caused by an increase in temperature of the read/write head. The specific distance that the read/write head is protruding toward the storage disk is determined by the drive circuitry based on the change in VGA amplitude, as provided above. In this embodiment, the change in VGA amplitude is not attributable to HtD spacing changes because the power level being directed to the slider mover, if any, is substantially constant.

In another embodiment, the drive circuitry can determine whether or not a deviation exists between the expected VGA amplitude and the actual VGA amplitude as a result of changes in altitude of the disk drive. For example, it is well known that an increase in altitude typically results in a decreased HtD spacing. Using the methods provided herein, the actual HtD spacing can be determined by the drive circuitry at any altitude. The drive circuitry can then compensate for the difference in HtD spacing between the disk drive at sea level and at altitude by decreasing the power level directed to the slider mover by an appropriate amount based on the equations provided herein, and relevant derivatives of these equations. Conversely, the drive circuitry can increase the power level to the slider mover by an appropriate amount, or other means of lowering the HtD spacing can be employed, if the ambient pressure increases.

With information regarding the actual HtD spacing, in certain designs, drives that would best suited for particular configurations could be identified. For example, drives with low flying heads when no power is directed to the slider mover could be identified and used for low format applications (low capacity) in which the write power is less and WPTP is less. Alternatively, drives with high flying heads could be better suited for drives for point of sale applications and personal video recorders.

Further, a different reader bias current limit could be used for each head, depending on the power directed to the slider mover associated with that head to achieve the desired HtD spacing. For example, if the drive has a high flying head that requires a significant amount of power to the slider mover to bring it down to a nominal HtD spacing, that slider mover will get hotter than the other heads. In this case, in certain embodiments, the reader element will be operated at a lower bias current.

Among other applications, the slider mover 200 can be used to accurately maintain, increase or decrease the HtD spacing at any time during operation of the disk drive. For example, in this embodiment, the drive circuitry can alternately or simultaneously direct power to the slider mover and the write element before, during or after writing in order to maintain a desired HtD spacing, as described in greater detail below.

In one embodiment, the drive circuitry controls the slider mover to avoid contact between the slider assembly and the disk, to position the head at the desired HtD spacing for reading, to position the head at the desired HtD spacing for writing, to position the head at a safe position during idle, and/or to position the head to recover data. In certain embodiments, with this design, a smaller area of the slider assembly is in close proximity to the disk during reading, writing and operation of the disk drive, and the effect of short range forces like van der Waals and electrostatic forces is reduced.

In certain embodiments, the ability to change the HtD spacing in-situ within the drive requires many changes in the way the drive is operated and the way the drive goes through self-test and optimization test. More specifically, the onset of deformation induced by the slider mover is not instantaneous and there is a mover time constant associated with the deformation caused by the slider mover. Similarly, the onset of deformation induced by WPTP is not instantaneous and there is a WPTP time constant associated with the deformation caused by the WPTP.

In certain designs, the amount of time (mover time constant) required to change the position with the slider mover is longer than the time required to switch between a read operation and a write operation. Further, because more heat is typically generated during a write operation than a read operation, less power to the slider mover is required during a write operation than a read operation to maintain the head at approximately the same HtD spacing. Stated in another fashion, because of the WPTP that occurs during the write operation, less power will be needed during a write operation because of the effect of the WPTP.

Figure 5A:
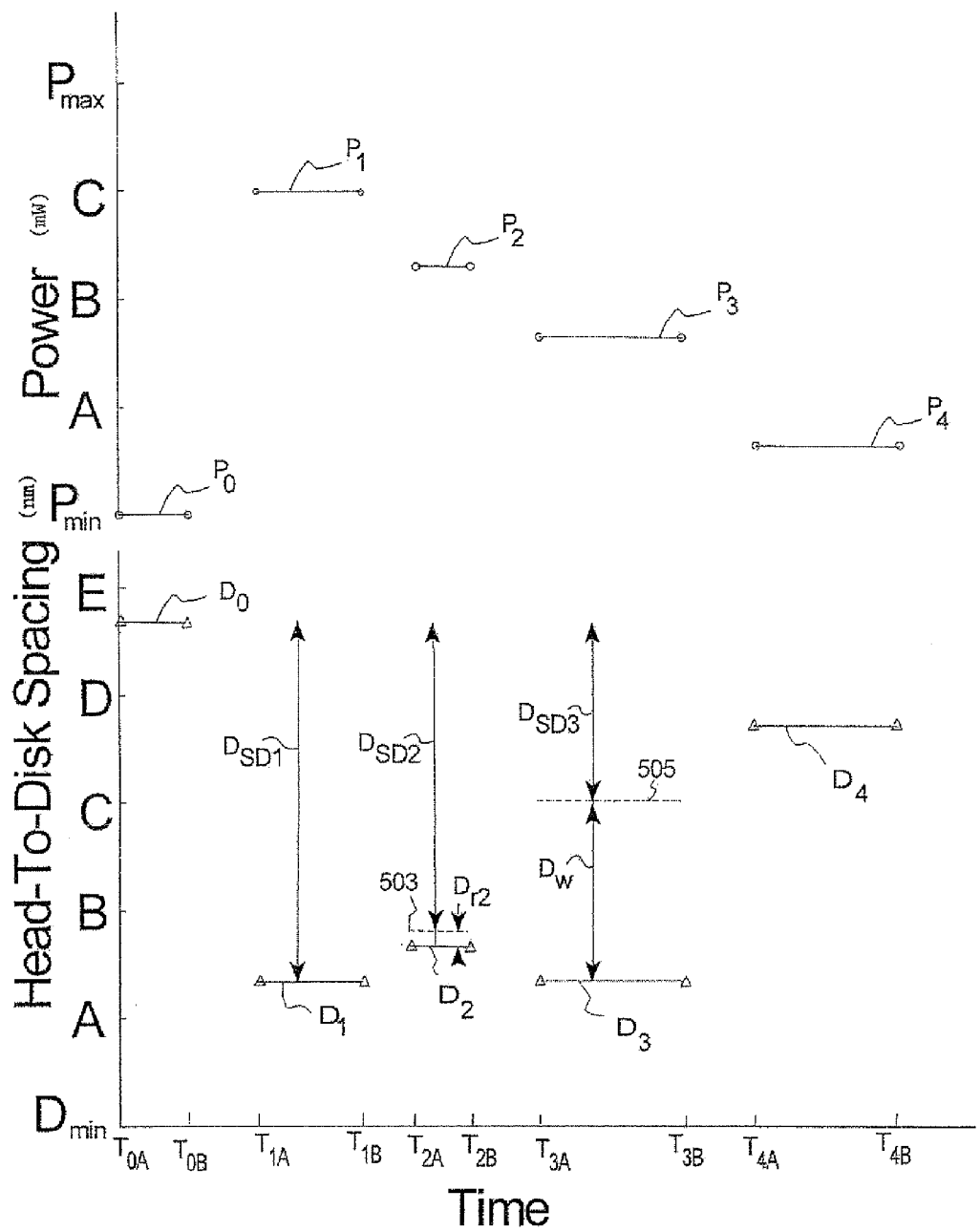
FIG. 5A is a graph that outlines the relationship between a power level that is directed to a slider assembly and the resulting HtD spacing during different drive operations.

FIG. 5A is a graph that outlines one embodiment of the relationship between the power level that the drive circuitry directs to the slider mover of a single slider assembly and the resulting HtD spacing during different drive operations. In certain embodiments, the drive circuitry controls the slider mover to achieve multiple, distinct and separate HtD spacings. The number and value of each of the separate HtD spacings can be varied to enhance the performance characteristics of the disk drive. In one embodiment, the drive circuitry directs power to the slider mover at five different, constant, steady state, power levels (an initial power level, a read power level, a pre-write power level, a write power level, and an idle power level) to achieve the five distinct, stabilized, HtD spacings (an initial HtD spacing, a read HtD spacing, a pre-write HtD spacing, a write HtD spacing, and an idle HtD spacing). Alternatively, for example, the drive circuitry can control the slider mover to achieve fewer than five or greater than five HtD spacings. For example, the drive circuitry can direct power to the slider mover at one or more data recovery power levels to achieve one or more data recovery HtD spacings.

In FIG. 5A, the power levels delivered to the slider mover are detailed on the upper half of the graph, and the resulting HtD spacings are detailed on the lower half of the graph. In FIG. 5A, $T_{OA}$ and $T_{OB}$ represents the time of initial startup of the drive. During $T_{OA}$ and $T_{OB}$, Line $P_0$ represents that an initial power level is delivered to the slider mover and line $D_0$ represents the resulting initial HtD spacing. At the initial power level, the drive circuitry directs a steady-state minimum power $P_{min}$, e.g. zero power, to the slider mover. As a result thereof, the initial HtD spacing is equal to the incoming, unchanged HtD spacing of the slider assembly. The value of the initial HtD spacing can vary according to the design of the drive and the manufacturing tolerances of the drive. In alternative, non-exclusive examples, the initial HtD spacing is approximately 5, 6, 7, 8, 9, or 10 nm. The length of time represented between $T_{OA}$ and $T_{OB}$ can be varied to suit the design requirements of the drive.

It should be noted that in some embodiments, the drive can perform the controlled head-to-disk contact of the slider assembly after initial startup of the drive and before performing any reading or writing operation with the head, e.g. between $T_{0B}$ and $T_{1A}$.

In FIG. 5A, $T_{1A}$ and $T_{1B}$ represents a time that the slider assembly is in a read position performing a steady-state read operation to read data from the data tracks. During $T_{1A}$ and $T_{1B}$, Line $P_1$ represents that a read power level is delivered to the slider mover and line $D_1$ represents a stabilized, read HtD spacing that results from the activation of the slider mover and the read element. At the read power level, the heat from the slider mover and the heat from the read element results in the read HtD spacing that is near the desired HtD spacing for reading data for that slider assembly. The exact read HtD spacing, and the amount of power delivered to the slider mover at the read power level can vary according to the design of the drive and the slider mover. In alternative, non-exclusive examples, the read HtD spacing is approximately 2, 3, 4, 5, or 6 nm and the read power level is approximately 20, 30, 40, 50, or 60 mW. The length of time represented between $T_{1A}$ and $T_{1B}$ will depend upon the read operation that is being performed.

Further, $D_{SD1}$ represents the amount of change to the HtD spacing that is caused by the read power level directed to the slider mover and $D_{r1}$ represents the amount of change of the HtD spacing that is caused by the current that is directed to the read element. In most designs, the current to the read element does not result in a significant change to the HtD spacing. However, in the event the current to the read element influences the HtD spacing, the read power level directed to the slider mover can be reduced accordingly.

As discussed above, less power to the slider mover is required during a write operation than a read operation to compensate for the WPTP and maintain the head at approximately the same HtD spacing. In certain designs, the mover time constant for moving the slider assembly between the read HtD spacing and the write HtD spacing with the slider mover is approximately 1 millisecond and the transition from a read operation to a write operation occur relatively quickly, approximately 0.3 milliseconds. This transition is further complicated because the WPTP time constant is typically less than the mover time constant.

In one embodiment, the drive circuitry adjusts the HtD spacing during the read operation prior to the read/write transition to reduce the likelihood that the HtD spacing falls below the read HtD spacing. More specifically, in certain embodiments, the present invention establishes a stabilized, higher HtD spacing during the read operation, just prior to the write operation, to reduce the likelihood of head-to-disk contact.

In FIG. 5A, the time between $T_{2A}$ and $T_{2B}$ represents a time that the head has been moved to a pre-write position prior to a write operation. The pre-write position can be used if a write operation is immediately following a read operation. During a portion or all of this time, the head is still reading data from the data tracks of the storage disk. The use of a pre-write position helps to compensate for any WPTP and the time constant of the slider mover.

During $T_{2A}$ and $T_{2B}$, $P_2$ represents a constant pre-write power level that is directed to the slider mover and line $D_2$ represents a stabilized, pre-write HtD spacing, that results from the activation of the slider mover and the read element. At the pre-write power level, the heat from the slider mover and the heat from the read element results in the head having the pre-write HtD spacing that will still allow the head to accurately read data from the data tracks. The exact pre-write HtD spacing and the magnitude of the pre-write power level can vary. In alternative, non-exclusive examples, the pre-write HtD spacing is approximately 4, 5, 6, or 7 nm and the pre-write power level is approximately 10, 20, 30, 40, 50, or 60 mW. The length of time represented between $T_{2A}$ and $T_{2B}$ will depend upon the design characteristics of the drive. For example, the length of time represented between $T_{2A}$ and $T_{2B}$ can be approximately 0.5, 1, 2, 3, or 4 milliseconds.

It should be noted that for a given slider mover, the pre-write power level is less than the read power level, and the pre-write HtD spacing is greater than the read HtD spacing. The difference between the pre-write power level and the read power level can vary. In alternative, nonexclusive embodiments, the difference between the pre-write power level and the read power level is approximately 5, 10, 20, 30, 40, 50, or 60 percent. Further, the difference between the pre-write HtD spacing and the read HtD spacing can vary. For example, the pre-write HtD spacing can be approximately 5-65 percent greater than the read HtD spacing. In alternative, nonexclusive embodiments, the difference between the pre-write HtD spacing and the read HtD spacing is approximately 10, 20, 30, 35, 36, 37, 38, 39, 40, 45, 50, or 60 percent. Stated differently, in alternative, nonexclusive embodiments, the difference between the pre-write HtD spacing and the read HtD spacing is approximately 0.5, 1, 1.5, 2, 2.5, or 3 nm. In certain designs, the pre-write HtD spacing is determined by the magnitude of the WPTP. Accordingly, the difference between the pre-write HtD spacing and the read HtD spacing can be set to be approximately 10, 20, 30, 35, 36, 37, 38, 39, 40, 45, 50, or 60 percent of the WPTP.

Dashed line 503 represents the HtD spacing that would occur if only the pre-write power level is directed to the slider mover and no current is directed to the read element. Further, $D_{SD2}$ represents the amount of change to the HtD spacing that is caused by the slider mover and $D_{r2}$ represents the amount of change of the HtD spacing that is caused by the current that is directed to the read head.

In FIG. 5A, $T_{3A}$ and $T_{3B}$ represents a time that the read/write head is moved to a steady state write position and is performing a steady-state write operation to the data tracks. During $T_{3A}$ and $T_{3B}$, Line $P_3$ represents a constant write power level that is directed to the slider mover and $D_3$ represents the write HtD spacing that results from the activation of the slider mover and the write element. At the write power level, the heat from the slider mover and the heat from the write element results in the head being positioned at the write HtD spacing that is near the desired HtD spacing for writing data. The exact write HtD spacing and the magnitude of the write power level can vary. In alternative, non-exclusive examples, the write HtD spacing is approximately 2, 3, 4, 5, or 6 nm and the write power level directed to the slider mover is approximately 20, 30, 40, 50, or 60 mW. The length of time represented between $T_{3A}$ and $T_{3B}$ will depend upon the write operation that is being performed.

In one embodiment, it should be noted that for a given head, the write power level is less than the read power level and the pre-write power level. The difference between the write power level and the pre-write power level can vary. In alternative, nonexclusive embodiments, the difference between the write power level and the pre-write power level is approximately 5, 10, 15, 20, 30, 40, or 50 percent. Moreover, in alternative, nonexclusive embodiments, the difference between the write power level and the read power level is approximately 10, 15, 20, 25, 30, or 40 percent.

Further, in FIG. 5A, the write HtD spacing is approximately equal to the read HtD spacing. In alternative, nonexclusive embodiments, the difference between the write HtD spacing and the read HtD spacing is less than approximately 1, 2, 5, 10 or 20 percent. Stated differently, in alternative, nonexclusive embodiments, the difference between the write HtD spacing and the read HtD spacing is less than approximately 0.2, 0.5, 1, 1.5 or 2 nm.

Dashed line 505 represents the HtD spacing that would occur if only the write power level is directed to the slider mover and no current is directed to the write element. Further, $D_{SD3}$ represents the amount of change to the HtD spacing that is caused by the slider mover and $D_W$ represents the amount of change of the HtD spacing that is caused by the current that is directed to the write element.

Moreover, in FIG. 5A, $T_{4A}$ and $T_{4B}$ represents a time that the head is moved to a steady state, idle position. During $T_{4A}$ and $T_{4B}$, Line $P_4$ represents that an idle power level is directed to the slider mover and line $D_4$ represents an idle HtD spacing that results from the activation of the slider mover. At the idle power level, the slider assembly is positioned near a maximum HtD spacing at which the head can accurately read the servo signals from the servo tracks. In certain embodiments, the head can not accurately read the data tracks at the idle position. The exact idle HtD spacing and the magnitude of the idle power level can vary according to the design of the drive and the design of the slider mover. In alternative, non-exclusive examples, the idle HtD spacing is approximately 5, 6, 7, or 8 nm and the idle power level is approximately 5, 10, 15, 20, 25, or 30 mW. The length of time represented between $T_{4A}$ and $T_{4B}$ will depend upon the operational requirements of the drive.

It should be noted that for a given head, the idle power level is less than the write power level, and the idle HtD spacing is greater than the write idle HtD spacing. The difference between the idle power level and the write power level can vary. In alternative, nonexclusive embodiments, the difference between the idle power level and the write power level is approximately 10, 20, 40, 60, 80, or 100 percent. Further, the difference between the idle HtD spacing and the write HtD spacing can vary. In alternative, nonexclusive embodiments, the difference between the idle HtD spacing and the write HtD spacing is approximately 10, 20, 40, 60, 80, or 100 percent. Stated differently, in alternative, nonexclusive embodiments, the difference the idle HtD spacing and the write HtD spacing is approximately 1, 2, 3, 4, or 5 nm.

With this design, when the drive has nothing to do, e.g. not performing a read operation or a write operation, the HtD spacing can be increased to the idle HtD spacing. As a result thereof, the head is exposed to less heat, the power consumption of the slider mover is less than at the other levels (except the initial level), and the head is flying at a safer distance away from the disk.

As used herein the terms initial power level, read power level, pre-write power level, write power level, idle power level, and/or data recovery power level can also be referred to as the first power level, the second power level, the third power level, and/or the fourth power level. Moreover, as used herein the terms initial HtD spacing, read HtD spacing, pre-write HtD spacing, write HtD spacing, idle HtD spacing and/or data recovery HtD spacing can also be referred to as the first HtD spacing, the second HtD spacing, the third HtD spacing, and/or the fourth HtD spacing.

Figure 5B:
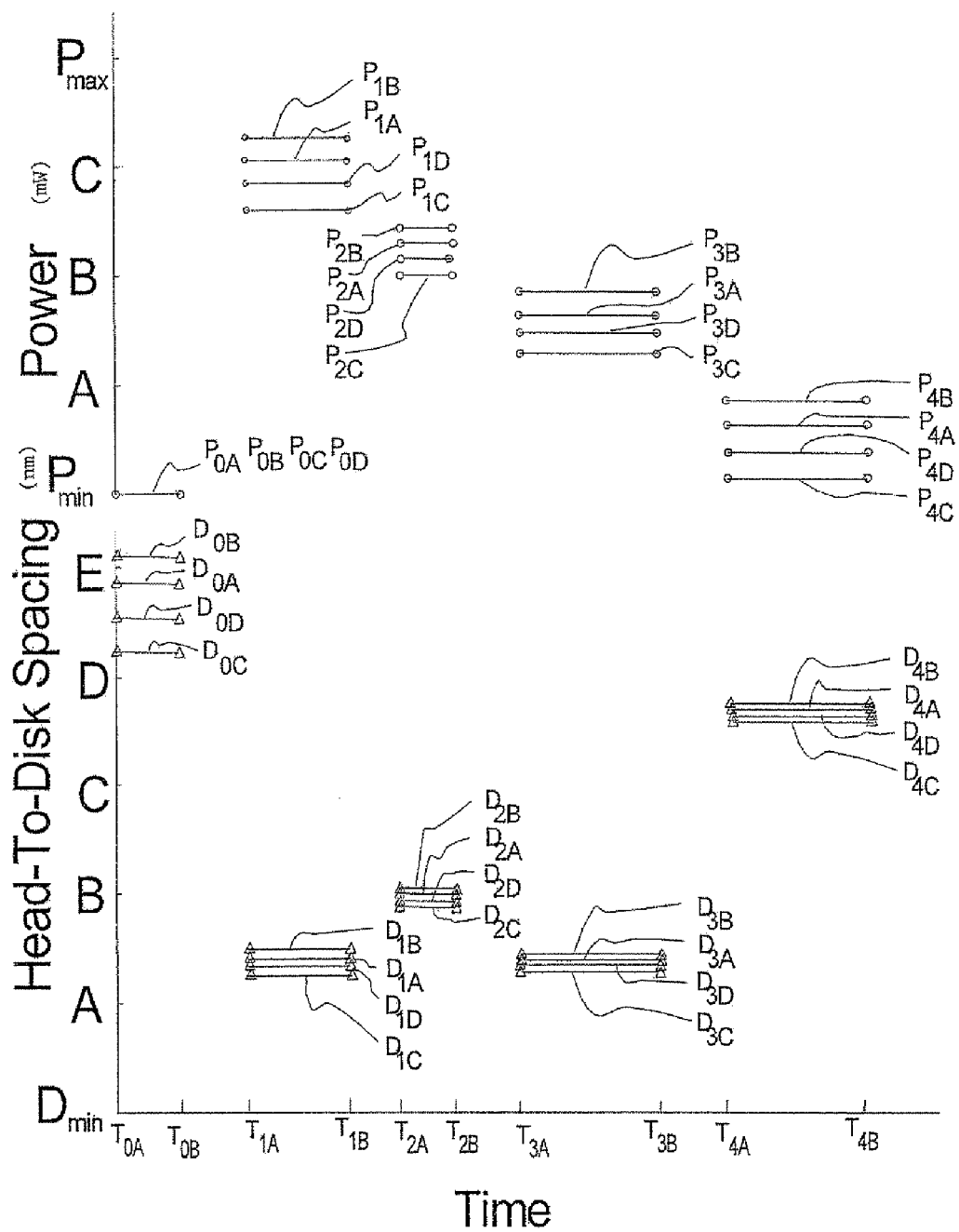
FIG. 5B is a graph that illustrates the relationship of the HtD spacing and power level distribution of a drive having four slider assemblies.

FIG. 5B is a graph that illustrates the relationship of one embodiment of the HtD spacing and power level distribution of a drive having four slider assemblies. In FIG. 5B, the HtD spacing of each slider assembly is detailed on the lower half of the graph and the power level directed to each slider mover is detailed on the upper half of the graph. It should be noted that this graph is merely illustrative of one possible embodiment of a four slider assembly drive. Further, the drive can be designed to have more than four or less than four slider assemblies or the drive circuitry can control the slider movers in another fashion.

$T_{0A}$ and $T_{0B}$ again represents the time of initial startup of the drive. During $T_{0A}$ and $T_{0B}$, (i) Lines $P_{0A}$, $P_{0A}$, $P_{0C}$, $P_{0D}$ represent that an initial power level is directed to the slider mover of each slider assembly, (ii) line DOA represents the initial HtD spacing of the first slider assembly that results from the initial power level $P_{0A}$ directed to the slider mover, (iii) line DOB represents the initial HtD spacing of the second slider assembly that results from the initial power level $P_{0A}$ directed to the slider mover, (iv) line Doc represents the initial HtD spacing of the third slider assembly that results from the initial power level $P_{0C}$ directed to the slider mover, and (v) line $D_{0D}$ represents the initial HtD spacing of the fourth slider assembly that results from the initial power level $P_{0D}$ directed to the slider mover. In one embodiment, the drive circuitry directs the minimum power ($P_{min}$), e.g. zero power, at the Initial Power Level. As a result thereof, the initial HtD spacing of each slider assembly is equal to the incoming, unchanged HtD spacing.

It should be noted that the incoming, initial HtD spacing distribution of the four slider assemblies is relatively large. In alternative, non-exclusive embodiments, the distribution of the four slider assemblies at the initial HtD spacing is at least approximately plus or minus 1, 2, or 3 nanometers. Stated in another fashion, the difference between the highest flying head and the lowest flying head at the initial HtD spacing is relatively large. For example, in alternative, non-exclusive embodiments, the difference between the highest flying head and the lowest flying head at the initial HtD spacing at this time is at least approximately 1, 2, 3, 4, 5, or 6 nanometers. Stated in another fashion, the difference between the highest flying head and the lowest flying head at the initial HtD spacing is at least approximately 10, 20, 30, or 40 percent.

In FIG. 5B, for comparison reasons, $T_{1A}$ and $T_{1B}$ represents a time that each head is performing a steady-state read operation. It should be noted that the heads typically are not performing a steady-state read operation at the same time.

During $T_{1A}$ and $T_{1B}$, (i) lines $P_{1A}$, $P_{1B}$, $P_{1C}$, $P_{1D}$ respectively represent the constant, read power level that is directed to the slider mover of the first, second, third and fourth slider assemblies, and (ii) lines $D_{1A}$, $D_{1B}$, $D_{1C}$, $D_{1D}$ respectively represent the resulting, steady state read HtD spacing of the first, second, third and fourth slider assemblies. In FIG. 5B, the read power level $P_{1A}$, $P_{1B}$, $P_{1C}$, $P_{1D}$ directed to each slider mover is not the same and a different power level is directed to each slider mover. More specifically, the read power levels $P_{1A}$, $P_{1B}$, $P_{1C}$, $P_{1D}$ directed to each slider mover can be precisely adjusted to achieve the desired read HtD spacing $D_{1A}$, $D_{1B}$, $D_{1C}$, $D_{1D}$ for each particular slider assembly. For example, in non-exclusive examples, the read power levels $P_{1A}$, $P_{1B}$, $P_{1C}$, $P_{1D}$ can vary approximately 5, 10, 15, 20, 30 or 40%. Alternatively, the drive could be designed so that the read power levels $P_{1A}$, $P_{1B}$, $P_{1C}$, $P_{1D}$ are approximately the same.

In one embodiment, if it is desired that each of the slider assemblies have approximately the same read HtD spacing during a read operation, then the read power levels $P_{1A}$, $P_{1B}$, $P_{1C}$, $P_{1D}$ directed to each slider mover can be precisely adjusted so that each of the slider assemblies have approximately the same read HtD spacing $D_{1A}$, $D_{1B}$, $D_{1C}$, $D_{1D}$. For example, if the initial HtD spacing Doc of the third head is less than the initial HtD spacing $D_{0B}$ of the second slider assembly, less power is directed to the slider mover of the third slider assembly than the slider mover of the second slider assembly at the read power level ($P_{1C}$ less than $P_{1B}$).

In FIG. 5B, for comparison reasons, $T_{2A}$ and $T_{2B}$ represents a time that each head is moved to the steady state pre-write position. It should be noted that the heads will typically not be in the pre-write position at the same time. During $T_{2A}$ and $T_{2B}$, (i) lines $P_{2A}$, $P_{2B}$, $P_{2C}$, $P_{2D}$ respectively represent the pre-write power level that is directed to the slider mover of the first, second, third and fourth slider assemblies, and (ii) lines $D_{2A}$, $D_{2B}$, $D_{2C}$, $D_{2D}$ respectively represent the resulting pre-write HtD spacing of the first, second, third and fourth slider assemblies. In this embodiment, the pre-write power levels $P_{2A}$, $P_{2B}$, $P_{2C}$, $P_{2D}$ directed to each slider assembly is not the same. Further, the pre-write power levels $P_{2A}$, $P_{2B}$, $P_{2C}$, $P_{2D}$ directed to each mover can be precisely adjusted to achieve the desired pre-write HtD spacing $D_{2A}$, $D_{2B}$, $D_{2C}$, $D_{2D}$ for each particular slider assembly. For example, in non-exclusive examples, the pre-write power levels $P_{2A}$, $P_{2B}$, $P_{2C}$, $P_{2D}$ can vary approximately 5, 10, 15, 20, 30 or 40%.

In one embodiment, if it is desired that each of the slider assemblies have approximately the same pre-write HtD spacing, then the pre-write power levels $P_{2A}$, $P_{2B}$, $P_{2C}$, $P_{2D}$ can be precisely adjusted so that each of the slider assemblies have approximately the same pre-write HtD spacing $D_{2A}$, $D_{2B}$, $D_{2C}$, $D_{2D}$. As a result thereof, the pre-write HtD spacing distribution $D_{2A}$, $D_{2B}$, $D_{2C}$, $D_{2D}$ is relatively narrow.

In FIG. 5B, for comparison reasons, $T_{3A}$ and $T_{3B}$ represents a time that each head is moved to the steady state write position. It should be noted that the heads will typically not be in the write position at the same time. During $T_{3A}$ and $T_{3B}$, (i) Lines $P_{3A}$, $P_{3B}$, $P_{3C}$, $P_{3D}$ represent the write power level that is directed to the slider mover of the first, second, third and fourth slider assemblies, respectively, and (ii) Lines $D_{3A}$, $D_{3B}$, $D_{3C}$, $D_{3D}$ represent the resulting write HtD spacing of the first, second, third and fourth slider assemblies, respectively. In this embodiment, the write power levels $P_{3A}$, $P_{3B}$, $P_{3C}$, $P_{3D}$ directed to each slider mover is not the same. Further, the write power levels $P_{3A}$, $P_{3B}$, $P_{3C}$, $P_{3D}$ directed to each slider mover can be precisely adjusted to achieve the desired write HtD spacing $D_{3A}$, $D_{3B}$, $D_{3C}$, $D_{3D}$ for each particular slider assembly. For example, in non-exclusive examples, the write power levels $P_{3A}$, $P_{3B}$, $P_{3C}$, $P_{3D}$ can vary approximately 5, 10, 15, 20, 30 or 40%. Alternatively, the drive could be designed so that the write power levels $P_{3A}$, $P_{3B}$, $P_{3C}$, $P_{3D}$ are approximately the same.

In one embodiment, if it is desired that each of the slider assemblies have approximately the same write HtD spacing, then the power levels $P_{3A}$, $P_{3B}$, $P_{3C}$, $P_{3D}$ can be precisely adjusted so that each of the slider assemblies have approximately the same write HtD spacing $D_{3A}$, $D_{3B}$, $D_{3C}$, $D_{3D}$. As a result thereof, the write HtD spacing distribution $D_{3A}$, $D_{3B}$, $D_{3C}$, $D_{3D}$ is relatively narrow.

In FIG. 5B, for comparison reasons, $T_{4A}$ and $T_{4B}$ represents a time that each head is moved to the idle position. It should be noted that the heads may not be in the idle position at the same time. During $T_{4A}$ and $T_{4B}$, (i) Lines $P_{4A}$, $P_{4B}$, $P_{4C}$, $P_{4D}$ represent the idle power level that is directed to the slider mover of the first, second, third and fourth slider assemblies, respectively, and (ii) Lines $D_{4A}$, $D_{4B}$, $D_{4C}$, $D_{4D}$ represent the resulting idle HtD spacing of the first, second, third and fourth slider assemblies, respectively. In this embodiment, the idle power level, $P_{4A}$, $P_{4B}$, $P_{4C}$, $P_{4D}$ directed to each slider mover is not the same. Further, the power levels $P_{4A}$, $P_{4B}$, $P_{4C}$, $P_{4D}$ can be precisely adjusted to achieve the desired idle HtD spacing $D_{4A}$, $D_{4B}$, $D_{4C}$, $D_{4D}$ for each particular slider assembly. For example, in non-exclusive examples, the idle power levels $P_{4A}$, $P_{4B}$, $P_{4C}$, $P_{4D}$ can vary approximately 5, 10, 15, 20, 30 or 40. Alternatively, the drive could be designed so that the idle power levels $P_{4A}$, $P_{4B}$, $P_{4C}$, $P_{4D}$ are approximately the same.

In one embodiment, if it is desired that each of the slider assemblies have approximately the same idle HtD spacing, then the idle power levels $P_{4A}$, $P_{4B}$, $P_{4C}$, $P_{4D}$ can be precisely adjusted so that each of the slider assemblies have approximately the same idle HtD spacing $D_{4A}$, $D_{4B}$, $D_{4C}$, $D_{4D}$. As a result thereof, the idle HtD spacing distribution $D_{4A}$, $D_{4B}$, $D_{4C}$, $D_{4D}$ is relatively narrow.

In summary, the drive circuitry can direct power $P_A$, $P_B$, $P_C$, $P_D$ to slider movers to decrease the distribution of the HtD spacing $D_A$, $D_B$, $D_C$, $D_D$ of the heads during one or more of the data transfer operations (read operation, pre-write operation, or write operation) or an idle operation. As a result thereof, the HtD spacing $D_A$, $D_B$, $D_C$, $D_D$ distribution of the slider assemblies during the data transfer operations can be relatively narrow. For example, the distribution of the HtD spacings during the data transfer operations can be adjusted to be between approximately plus or minus 0.2, 0.4, 0.6, 0.8, 1, or 2 nm. In alternative, non-exclusive embodiments, the distribution of the heads during the data transfer operations is at least approximately 5, 10, 15, 20, 30, 40, 50, 60, or 70 percent less than the distribution of the heads at the initial HtD spacing. Stated in another fashion, the difference between the highest flying head and the lowest flying head during data transfer is relatively small. For example, in alternative, non-exclusive embodiments, the difference between the highest flying head and the lowest flying head during a data transfer operation is less than approximately 0.2, 0.4, 0.6, 0.8, 1, or 1.5 nanometers.

In FIG. 5B, the difference between the highest flying head and the lowest flying head at the initial HtD spacing is greater than the difference between the highest flying head and the lowest flying head during data transfer. For example, the difference between the highest flying head and the lowest flying head at the initial HtD spacing is at least approximately 5, 10, 15, 20, 30, 40, 50, 60, or 70 percent greater than the difference between the highest flying head and the lowest flying head during data transfer.

Figure 5C:
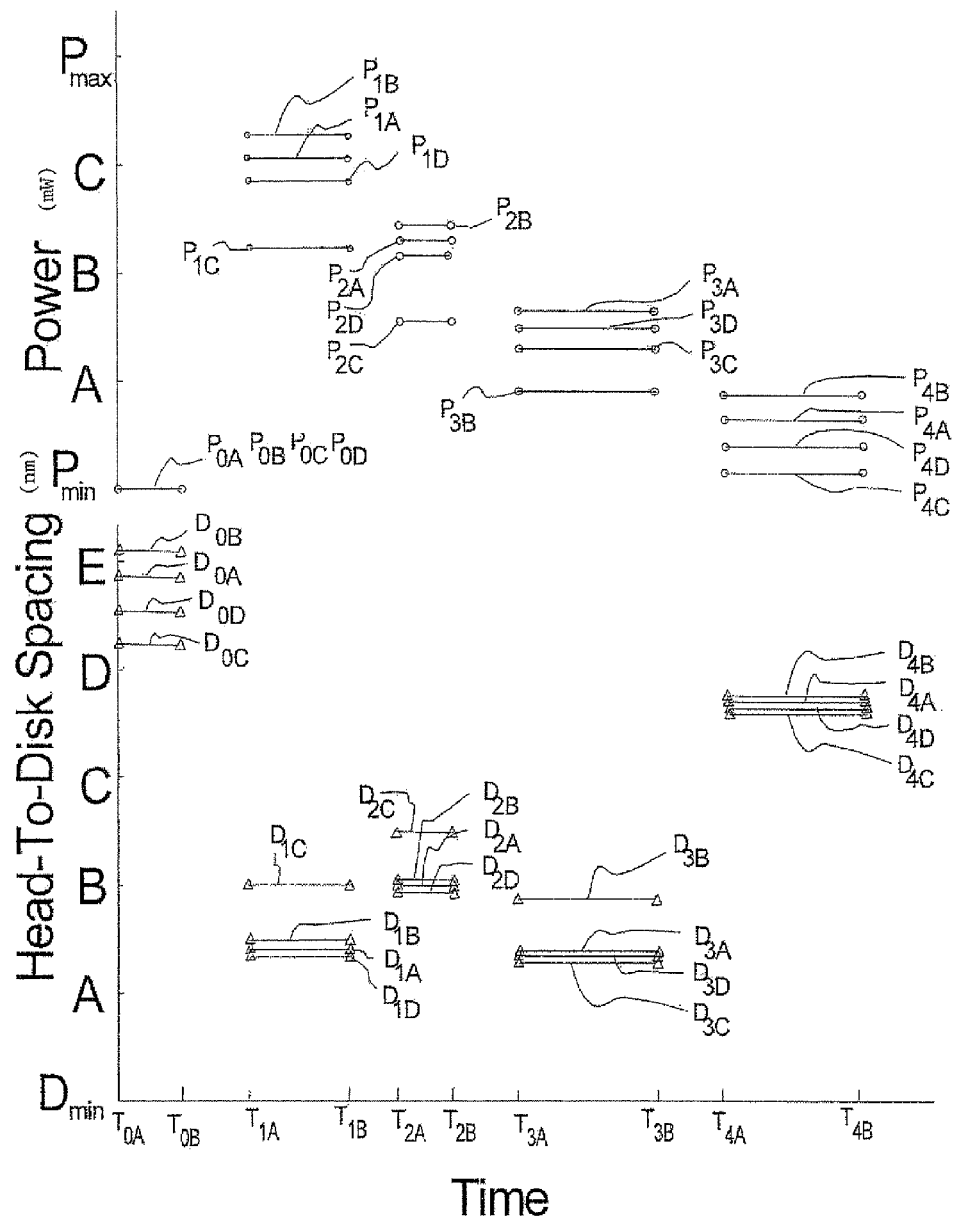
FIG. 5C is a graph that illustrates an alternative relationship of the HtD spacing and power level distribution for a drive having four slider assemblies.

FIG. 5C is a graph that illustrates an alternative relationship of the HtD spacing and power level distribution for a drive having four slider assemblies. In FIG. 5C, the HtD spacing of each slider assembly is detailed on the lower half of the graph and the power level directed to each slider mover is detailed on the upper half of the graph. This graph is merely illustrative of another possible embodiment of the operation of a four slider assembly drive.

It should be noted that in some embodiments, the drive circuitry can perform a performance test on one or more of the heads to determine the performance characteristics, e.g. the quality, of the one or more heads and to determine if one or more of the heads is more efficient than the other heads. As an example, (i) each head can be tested to determine a maximum read HtD spacing that the head can accurately read data from the data tracks on the storage disk, and/or (ii) each head can be tested to determine a maximum write HtD spacing that the head can accurately write data to the data tracks on the storage disk. Subsequently, the drive circuitry can direct power to the slider mover associated with each head at the appropriate level to achieve the desired HtD spacing for each head.

The performance test, for example, can be performed after initial startup of the drive, after performing the controlled head-to-disk contact, without performing the controlled head-to-disk contact and/or before performing any reading or writing operation with the head, e.g. between $T_{0B}$ and $T_{1A}$. Alternatively, the performance test can be performed periodically at timed intervals during use of the disk drive. Still alternatively, the performance test can occur before, during or after certain events, such as at each startup, and/or transitions between various operations of the disk drive and/or other designated triggering events. Still alternatively, the performance tests can occur constantly or on an instantaneous basis.

As an example, if it is determined that the third head can accurately read data at a higher read HtD spacing than the other heads, the drive circuitry directs a lower read, pre-write, and idle power level $P_{1C}$, $P_{2C}$, $P_{4C}$ to the slider mover that moves the third head than the other heads during the read, pre-write and idle operations so that the read, pre-write, and idle HtD spacings $D_{1C}$, $D_{2C}$, $D_{4C}$ of the third head are higher than the corresponding read, pre-write, and idle HtD spacings of the other heads.

Somewhat similarly, if it is determined that the second head can accurately write data at a higher write HtD spacing than the other heads, the drive circuitry directs a lower write power level $P_{3B}$ to the slider mover that moves the second head than the other heads so that the write HtD spacing $D_{3B}$ of the second head is higher than the write HtD spacing of the other heads. With this design, each head can be individually positioned to accurately transfer data, while maintaining a safer HtD spacing, with reduced likelihood of head-to-disk contact, and less power consumption by the slider mover.

In alternative, non-exclusive embodiments, during a read operation, pre-write operation, a write operation, and/or idle operation, the drive circuitry can direct approximately 20, 30, 40, 50, 60, or 70% more power to the slider mover of an inefficient head than to the slider mover of an efficient head. This can result in a controlled difference of approximately 0.5, 1, 2, 3, 4, 5 or 6% between the HtD spacing of the inefficient head as compared to the efficient head.

With this design, the drive circuitry does not control the slider mover of each head to maintain approximately the same HtD spacings during the data transfer operations. Instead, this embodiment is a performance driven system in which the drive circuitry directs power to the slider mover of each head to maintain that particular head at its individual desired HtD spacing. In certain embodiments, this design increases the HtD spacing to the highest level that will still achieve the desired data transfer accuracy.

In summary, the power $P_A$, $P_B$, $P_C$, $P_D$ can be directed to the slider movers to increase the distribution of the HtD spacing of the heads during one or more of the data transfer operations. As a result thereof, the HtD spacing distribution of the slider assemblies $D_A$, $D_B$, $D_C$, $D_D$ during the data transfer operations can be relatively large. For example, the distribution of the HtD spacings during the data transfer operations can be between approximately 1 and 6 nm. In alternative, non-exclusive embodiments, the distribution of the heads during the data transfer operations is at least approximately 5, 10, 20, or 30 percent greater than the distribution of the heads at the initial HtD spacing.

In FIG. 5C, the difference between the highest flying head and the lowest flying head at the initial HtD spacing is less than the difference between the highest flying head and the lowest flying head during data transfer. For example, the difference between the highest flying head and the lowest flying head at the initial HtD spacing is at least approximately 10, 20 or 30 percent less than the difference between the highest flying head and the lowest flying head during data transfer.

In one embodiment, to test the reading characteristics for each head, during a read operation, the drive circuitry sequentially directs more power to the slider mover to sequentially lower the HtD spacing while reading data from the data tracks until that head begins reading data at an acceptable performance level. Similarly, to test the writing characteristics for each head, during a write operation, the drive circuitry sequentially directs more power to the slider mover to sequentially lower the HtD spacing while writing data to the data tracks until that head begins writing data at an acceptable performance level.

Figure 5D:
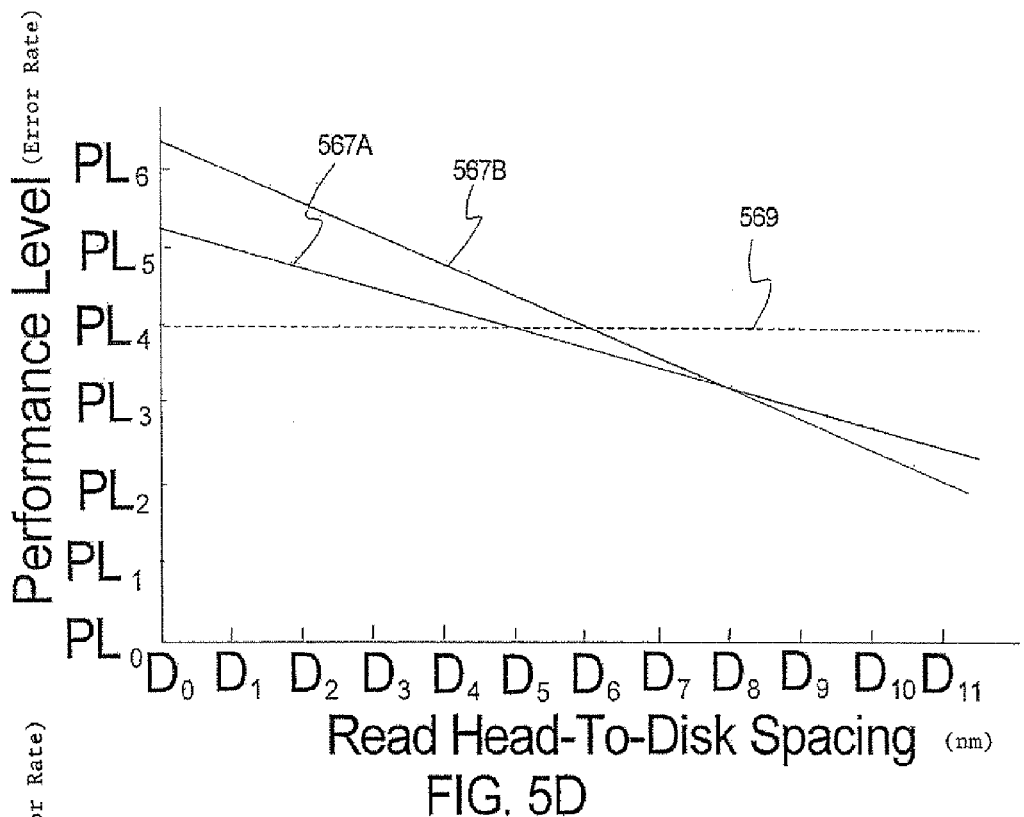
FIG. 5D is a graph that illustrates a read performance test on two heads.

FIG. 5D is a graph that illustrates a non-exclusive example of the relationship between the performance level of a first head and a second head during read operations and the corresponding HtD spacings of those heads. In this embodiment, line 567A represents the performance level of the first head during a read operation and line 567B represents the performance level of the second head during a read operation. Typically, the performance level of each head during a read operation decreases as the HtD spacing increases.

In FIG. 5D, dashed line 569 represents a minimum acceptable performance level during a read operation. In this example, performance levels above $PL_4$ are acceptable and performance levels below $PL_4$ are unacceptable. As a result thereof, for the first head, the read HtD spacing must be less than $D_5$ (first test result) to achieve the desired read performance of the first head. Somewhat similarly, for the second head, the read HtD spacing must be less than $D_6$ (second test result) to achieve the desired read performance of the second head. With this design, during read operations, the drive circuitry directs power to the slider movers to achieve the desired read HtD spacings based upon the test results of the performance test.

Figure 5E:
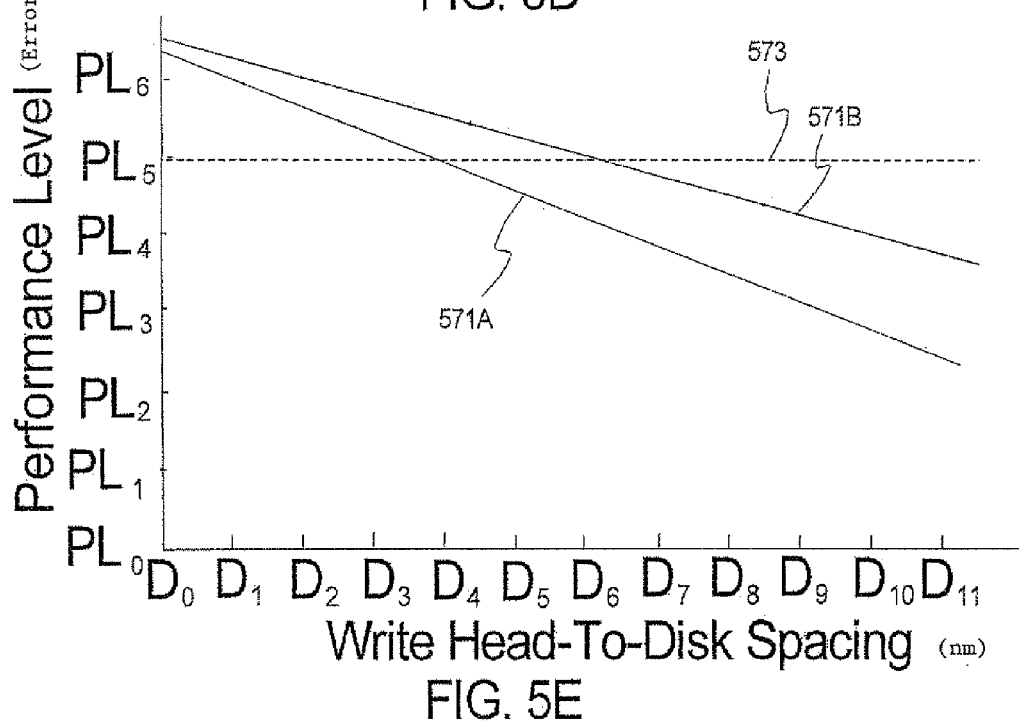
FIG. 5E is a graph that illustrates a write performance test on two heads.

FIG. 5E is a graph that illustrates a non-exclusive example of the relationship between the performance level of a first head and a second head during write operations and the corresponding HtD spacings of those heads. In this embodiment, line 571A represents the performance level of the first head during a write operation and line 567B represents the performance level of the second head during a write operation. Typically, the performance level of each head during a write operation decreases as the HtD spacing increases.

In FIG. 5E, dashed line 573 represents a minimum acceptable performance level during a write operation. In this example, performance levels above $PL_5$ are acceptable and performance levels below $PL_5$ are unacceptable. As a result thereof, for the first head, the write HtD spacing must be less than $D_4$ (first test result) to achieve the desired write performance of the first head. Somewhat similarly, for the second head, the write HtD spacing must be less than $D_6$ (second test result) to achieve the desired write performance of the second head. With this design, during write operations, the drive circuitry directs power to the slider movers to achieve the desired write HtD spacings based upon the test results of the performance test.

The type of read and write performance test performed on each head can vary. In one embodiment, the performance test is a bit error rate ("BER") test. Data is recorded on the storage disk in a sequence of units known as "bits". Bits can be either ones or zeroes, and the number of bits and their order define the stored information. A bit error occurs when the expected bit value is incorrect. For example, bit error occurs when a zero is present instead of a one. Bit error rate (BER) is the number of bits in error in a predetermined number of bits recorded, which is usually expressed as ten to a negative power. For example, 10-6 means 1 bit out of 1,000,000 bits recorded is in error.

The actual level of the BER that is unacceptable can varied to achieve the desired accuracy of the drive. For example, in non-exclusive embodiments, an unacceptable BER level is approximately 10-6, 10-5, 10-4, 10-3, or larger.

Alternatively or additionally, the performance test can be a sector error rate ("SER"). For a disk drive, a sector is the minimum track segment on the disk that can store information. Bytes are a sequence of bits, and, by definition, a byte is 8 bits long. A sector can vary in size but today is typically 512 bytes long. A sector is in error if a single or multiple bits within the sector are incorrect. Sector error rate (SER) is the number of sectors in error in a predetermined numbers of sectors recorded. Typically, 256 sectors are written in a SER test because this corresponds to 1,048,576 bits, which is close to 1,000,000 bits. SER results are usually expressed as a percentage. For example, 0.39% means 1 out of 256 sectors recorded is in error.

The actual level of the SER that is unacceptable can vary. For example, in non-exclusive embodiments, an unacceptable SER level can be approximately 0.39%, 0.78%, 1.17%, 1.56%, or larger.

In this embodiment, for example, the performance test can be utilized to insure that the head is accurately reading and writing data at the maximum HtD spacing used in the drive. It should be noted that one or more features of the present invention can be used in a design in which the actual HtD spacing is determined and monitored during at least a portion of the operation of the disk drive. Alternatively, one or more features of the present invention can be used in a design in which the actual HtD spacing is not known or determined. As a result thereof, the controlled head-to-disk contact may not be necessary.

In certain embodiments, the performance test can be performed at a known temperature. With this design, with a know dependency of the slider performance versus temperature, the test results can be adapted to any drive operating temperature.

The rates at which the drive circuitry directs power to the slider mover during the transitions between (i) the initial power level $P_0$ and the read power level $P_1$ (startup to read transition) (ii) the read power level $P_1$ and the pre-write power level $P_2$ (read to pre-write transition), (iii) the pre-write power level $P_2$ and the write power level $P_3$ (pre-write to write transition), (iv) the write power level $P_3$ and the idle power level $P_4$ (write to idle transition), (v) the read power level $P_2$ and the idle power level $P_4$ (read to idle transition), (vi) the initial power level $P_0$ and the write power level $P_3$ (startup to write transition), (vii) the idle power level $P_4$ and the write power level $P_3$ (idle to write transition), (viii) the idle power level $P_4$ and the read power level $P_1$ (idle to read transition), (ix) the write power level $P_3$ and the read power level $P_1$ (write to read transition), and/or (x) the initial power level $P_0$ and the idle power level $P_4$ (initial to idle transition) can be varied to suit the performance characteristics of the drive, to reduce the likelihood of head-to-disk contact, to compensate for fly height dynamics and the associated time constants encountered in the transitions. Stated in another fashion, the drive circuitry adjusts the power that is applied to the slider mover over time to keep the head at a suitable HtD spacing in the transitions.

Figure 6A:
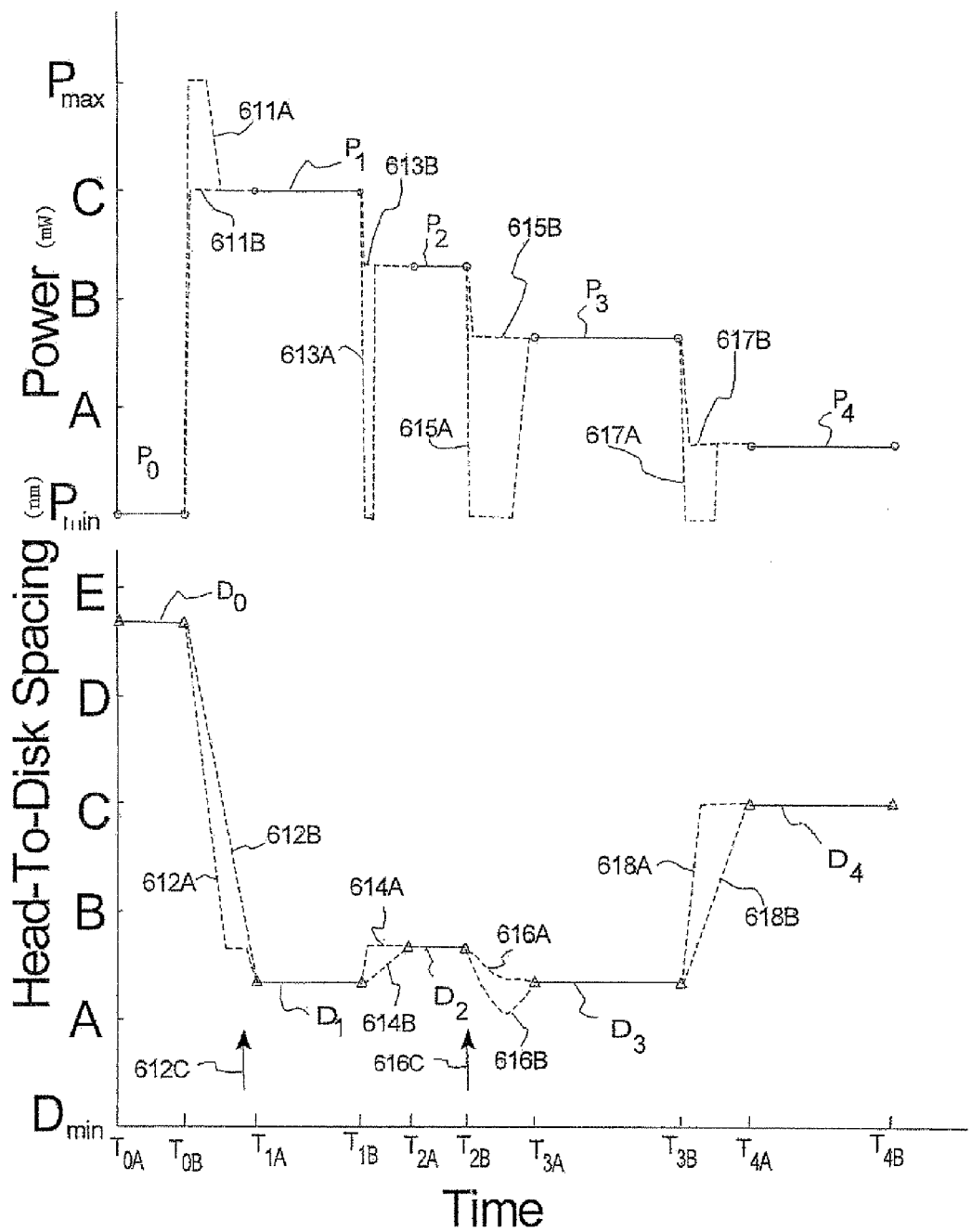
FIG. 6A is a graph that illustrates two alternative, non-exclusive, embodiments of how the power can be delivered to the slider mover for a single head between multiple power levels.

FIG. 6A illustrates two alternative, non-exclusive, embodiments of how power can be delivered to the slider mover for a single head in transition between the power levels $P_0$, $P_1$, $P_2$, $P_3$, $P_4$. In FIG. 6A, lines 611A, 611B represent alternative profiles of how power can be directed to the slider mover during a first transition, the time between $T_{0B}$, $T_{1A}$ (transition from initial to read operation, $P_0$, $P_1$). Line 611A illustrates that the drive circuitry quickly ramps up the transition power that is directed to the slider mover to the maximum power that can be directed to the slider mover. Subsequently, the drive circuitry quickly ramps down the variable transition power until the power is equal to $P_1$. In this embodiment, the transition power is initially set at a level in excess of $P_1$ (to hasten reaching fly height equilibrium) and then decays to the lower $P_1$ (i.e. overshoot and settle) once equilibrium at the read HtD spacing is reached. Alternatively, profile 611B illustrates that drive circuitry quickly ramps up the transition power that is directed to the slider mover until the transition power is equal to $P_1$.

Further, in FIG. 6A, line 612A represents the profile of how the HtD spacing will change when the power profile 611A is applied to the slider mover. Somewhat similarly, line 612B represents the profile of how the HtD spacing will change when power profile 611B is applied to the slider mover. Arrow 612C represents the approximate time when reading commences.

It should be noted that profile 611A will result in the HtD spacing approaching the read HtD spacing faster than profile 611B. It should be noted that other power profiles can be utilized in the first transition. For example, the drive circuitry can initially direct power to the slider at any level that is greater than or equal to $P_1$ and less than or equal to the maximum power $P_{max}$. Subsequently, the drive circuitry quickly ramps down the transition power until the transition power is equal to $P_1$. In alternative, non-exclusive examples, the transition power during a portion of the first transition can be can be approximately 5, 10, 20, 30, 50, 100, 200, or 300 percent greater than $P_1$.

It should be noted that if a head-to-disk contact procedure or a performance test is performed during the initial startup, that the power delivered to the slider mover will be different than the power profiles 611A, 611B that are illustrated in FIG. 6A.

In FIG. 6A, lines 613A, 613B represent alternative profiles of how power can be directed to the slider mover during a second transition, the time between $T_{1B}$, $T_{2A}$ (transition from read to pre-write, $P_1$, $P_2$). Profile 613A illustrates that the drive circuitry quickly ramps down the power that is directed to the slider mover to the minimum power $P_{min}$ that can be directed to the slider mover. Subsequently, the drive circuitry quickly ramps up the power until the power is equal to $P_2$. In this embodiment, the transition power is initially set at a level that is lower than $P_2$ (to hasten reaching fly height equilibrium) and then increased to $P_2$ (i.e. overshoot and settle) once equilibrium at the pre-write HtD spacing is reached. Alternatively, profile 613B illustrates that drive circuitry quickly down the power that is directed to the slider mover until the power is equal to $P_2$.

It should be noted that profile 613A will achieve the pre-write HtD spacing faster than profile 613B. It should be rioted that other power profiles can be utilized in the second transition. For example, the drive circuitry can initially direct the transition power to the slider mover at any level that is less than or equal to $P_2$ and greater than or equal to the minimum power $P_{min}$ (i.e. undershoot and settle). Subsequently, the drive circuitry quickly ramps up the transition power until the transition power is equal to $P_2$. In alternative, non-exclusive examples, the transition power during a portion of the second transition can be approximately 5, 10, 20, or 30 percent less than $P_2$.

Further, in FIG. 6A, line 614A represents the profile of how the HtD spacing will change when power profile 613A is applied to the slider mover. Somewhat similarly, line 614B represents the profile of how the HtD spacing will change when power profile 613B is applied to the slider mover.

In FIG. 6A, lines 615A, 615B represent alternative profiles of how power can be directed to the slider mover during a third transition, the time between $T_{2B}$, $T_{3A}$ (transition from pre-write to write, $P_2$, $P_3$). Profile 615A illustrates that drive circuitry quickly ramps down the power that is directed to the slider mover to the minimum power $P_{min}$ that can be directed to the slider mover. Subsequently, the drive circuitry quickly ramps up the power until the power is equal to $P_3$. In this embodiment, the transition power is initially set at a level that is lower than $P_2$ and then increased to $P_3$ once equilibrium at the write HtD spacing is reached. Alternatively, profile 615B illustrates that drive circuitry quickly ramps down the power that is directed to the slider mover until the power is equal to $P_3$.

Further, in FIG. 6A, line 616A represents the profile of how the HtD spacing will change when the power profile 615A is applied to the slider mover. Somewhat similarly, line 616B represents the profile of how the HtD spacing will change when power profile 615B is applied to the slider mover. Arrow 615C represents when writing commences.

It should be noted that profile 615A may achieve the write HtD spacing faster than profile 615B and without the HtD spacing falling below D3. Further, with profile 615B, there is a likelihood that the HtD spacing will initially drop below the write HtD spacing D3. This can be caused by the WPTP time constant being less than the mover time constant. Thus, the power directed to the slider mover must be quickly reduced at the beginning of the write procedure to reduce the likelihood of the HtD spacing falling below the write HtD spacing D3 and the likelihood of a head-to-disk collision.

It should be noted that other transition power profiles can be utilized in the third transition. For example, the drive circuitry can initially direct power to the slider mover at any level that is less than or equal to $P_3$ and greater than or equal to the minimum power $P_{min}$. Subsequently, the drive circuitry quickly ramps up the power until the power is equal to $P_3$. In alternative, non-exclusive examples, the power during a portion of the third transition can be can be approximately 5, 10, 20, 30, or 40 percent less than $P_3$.

In FIG. 6A, lines 617A, 617B represent alternative profiles of how power can be directed to the slider mover during a fourth transition, the time between $T_{3B}$, $T_{4A}$ (transition from write power level to idle power level, $P_3$, $P_4$). Profile 617A illustrates that drive circuitry quickly ramps down the transition power that is directed to the slider mover to the minimum power $P_{min}$ that can be directed to the slider mover. Subsequently, the drive circuitry ramps up the power until the power is equal to $P_4$. Alternatively, profile 617B illustrates that drive circuitry ramps down the power that is directed to the slider mover until the power is equal to $P_4$. It should be noted that profile 617A can achieve the idle HtD spacing D4 faster than profile 617B.

Further, in FIG. 6A, line 618A represents the profile of how the HtD spacing will change when the power profile 617A is applied to the slider mover. Somewhat similarly, line 618B represents the profile of how the HtD spacing will change when power profile 617B is applied to the slider mover.

It should be noted that other power profiles can be utilized in the fourth transition. For example, the drive circuitry can initially direct the transition power to the slider mover at any level that is less than or equal to $P_4$ and greater than or equal to the minimum power $P_{min}$. Subsequently, the drive circuitry quickly ramps up the transition power until the transition power is equal to $P_4$. In alternative, non-exclusive examples, the transition power during a portion of the fourth transition can be can be approximately 5, 10, 20, or 30 percent less than $P_4$.

In certain embodiments, if the disk drive is performing multiple non-contiguous similar events, (e.g. multiple write events) the slider mover has already moved the head to the proper position, e.g. the write HtD spacing $D_3$. Accordingly, the drive circuitry does not have to direct power to the slider mover to cause an overshoot or an undershoot of the head to occur. Stated in another fashion, the drive circuitry only causes an overshoot of power or an undershoot of power (depending upon the prior HtD spacing) to the slider mover during the first mode transition to the write HtD spacing. Upon a second (and subsequent) closely spaced in time (in certain embodiments ~200 microseconds or less) write event, the head is already at the desired write HtD spacing and the drive circuitry prevents an overshoot or undershoot of power from being directed to the slider mover. Thus, the write HtD spacing is maintained during multiple non-contiguous write events and no overshoot/undershoot of power is required.

Figure 6B:
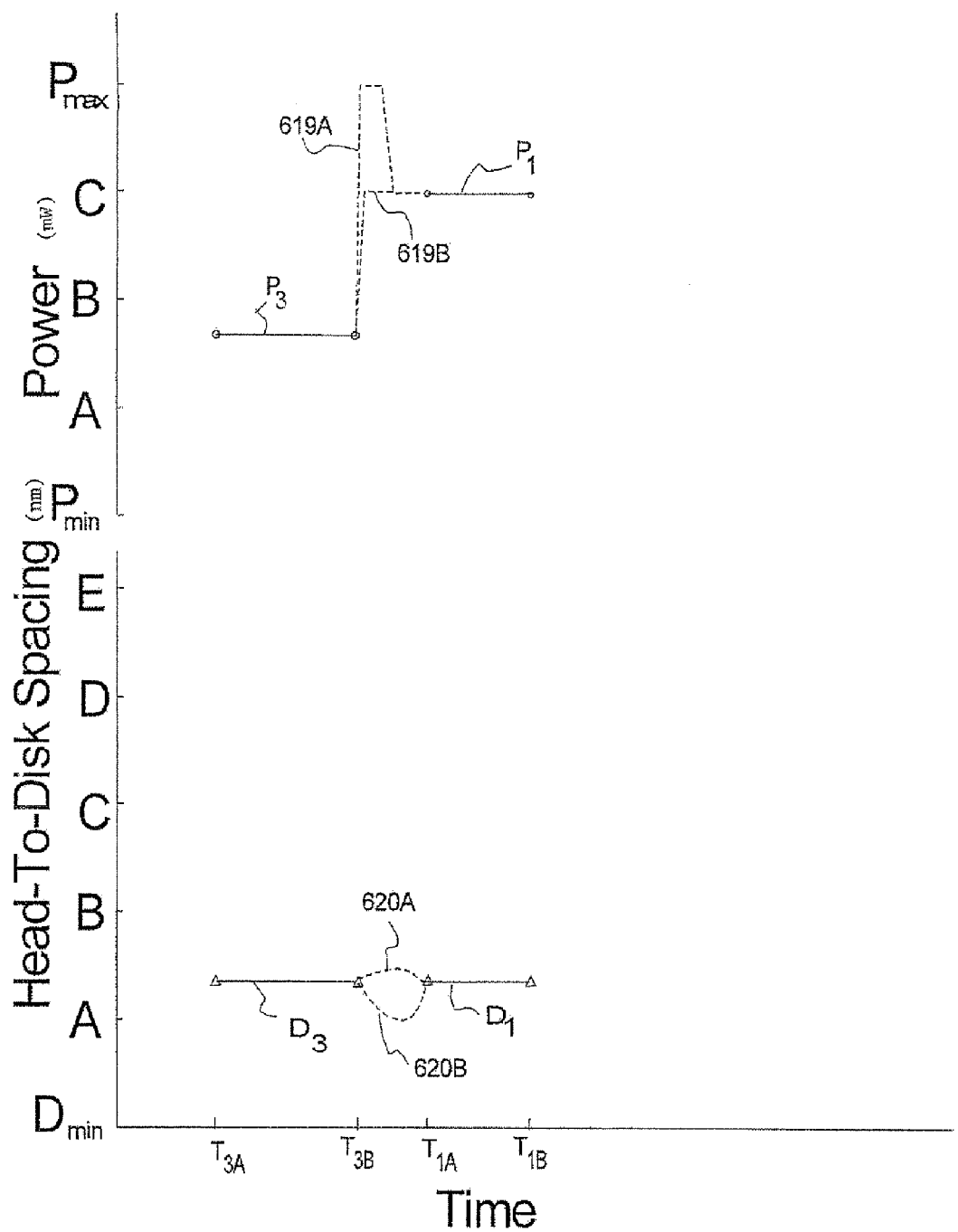
FIG. 6B is a graph that illustrates two alternative, non-exclusive, embodiments of how the power can be delivered to the slider mover during other transitions.

FIG. 6B illustrates how power is applied during a write to read transition. In FIG. 6B, lines 619A, 619B represent alternative profiles of how power can be directed to the slider mover during a write to read transition, the time between $T_{3B}$, $T_{1A}$ (transition from $P_3$, $P_2$). It should be noted that when a read operation follows a write operation, the slider mover must be controlled to allow WPTP to subside prior to directing the read power level to the slider mover to avoid head-to-disk contact. In certain designs, this is not an issue because the WPTP retracts faster than the actuation caused by the slider mover.

Profile 619A illustrates that drive circuitry quickly ramps up the power that is directed to the slider mover to the maximum power that can be directed to the slider mover. Subsequently, the drive circuitry quickly ramps down the power until the power is equal to $P_1$. Alternatively, profile 619B illustrates that drive circuitry quickly ramps up the power that is directed to the slider mover until the power is equal to $P_1$.

Further, in FIG. 6B, line 620A represents the profile of how the HtD spacing will change when power profile 619A is applied to the slider mover. Somewhat similarly, line 620B represents the profile of how the HtD spacing will change when power profile 619B is applied to the slider mover. It should be noted that profile 619A can result in the HtD spacing approaching D1 faster than profile 619B.

It should be noted that other power profiles can be utilized in this transition. For example, the drive circuitry can initially direct power to the slider at any level that is greater than or equal to $P_1$ and less than or equal to the maximum power $P_{max}$. Subsequently, the drive circuitry ramps down the power to $P_1$. In alternative, non-exclusive examples, the power during a portion of the write to read transition can be can be approximately 5, 10, 20, 30, or 40 percent greater than $P_1$.

In general, during a transition from a first power level to a second power level that is lower than the first power level, the transition power during a portion of the transition can be less than or equal to the second power level and greater than or equal to the minimum power $P_{min}$. Subsequently, the drive circuitry ramps up the power to be equal to the second power level. In alternative embodiments, the transition power is at least approximately 10, 20, 30, 50, 60 or 100 percent less than the second power level during at least a portion of the transition.

Somewhat similarly, during a transition from a first power level to a second power level that is higher than the first power level, the transition power during a portion of the transition can be greater than or equal to the second power level and less than or equal to the maximum power $P_{max}$. Subsequently, the drive circuitry ramps down the power to be equal to the second power level. In alternative embodiments, the transition power is at least approximately 10, 20, 30, 50, 60 or 100 percent greater than the second power level during at least a portion of the transition.

Figure 7:
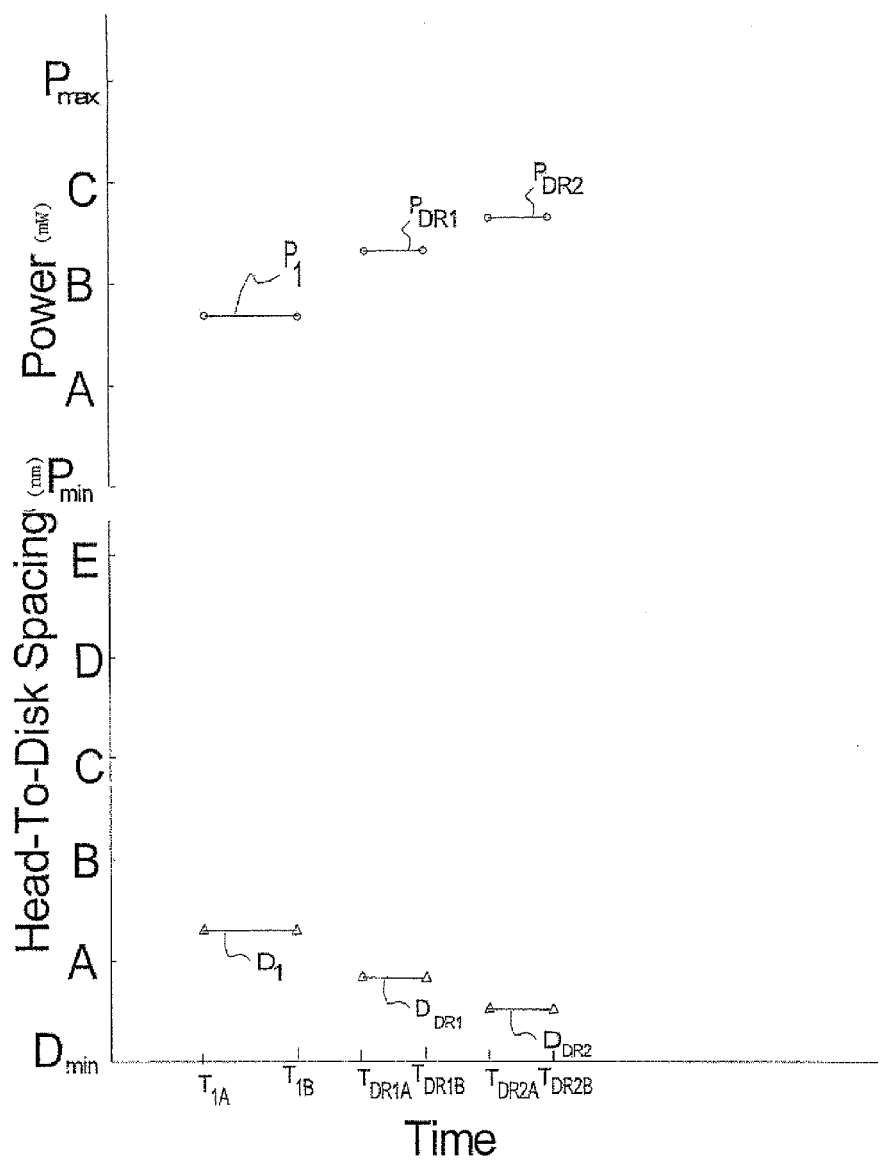
FIG. 7 is a graph that illustrates how data recovery can be performed with the present invention.

In certain embodiments, the present invention can be use to recover data from the storage disk. More specifically, FIG. 7 is a graph that illustrates that the head can be positioned at one or more data recovery HtD spacings to facilitate the recovery of data from the storage disk that is not readable during a normal read operation. In FIG. 7, the power levels directed to the slider mover are detailed on the upper half of the graph, and the resulting HtD spacing levels are detailed on the lower half of the graph.

In FIG. 7, $T_{1A}$ and $T_{1B}$ represents a time that the slider assembly is in a read position performing a typical steady-state read operation to read data from the data tracks. Line $P_1$ represents that a read power level directed to the slider mover and line $D_1$ represents the resulting read HtD spacing. The read HtD spacing can be similar to the read Htd spacing described above.

In certain situations, data on the storage disk is not readable while the head is at the read HtD spacing. In this embodiment, the drive circuitry can control the slider mover to reduce the HtD spacing to attempt to recover the data that is not readable during a normal read operation. In one embodiment, the drive circuitry can control the slider mover to achieve multiple distinct data recovery HtD spacings. For example, in FIG. 7, the drive circuitry directs power to the slider mover at two different, steady state data recovery power levels to achieve the two distinct data recovery HtD spacings. Alternatively, for example, the drive circuitry can control the slider mover to achieve fewer than two or greater than two data recovery HtD spacings.

In FIG. 7, $T_{DR1A}$ and $T_{DR1B}$ represents the time that the drive is performing a first data recovery attempt. During $T_{DR1A}$ and $T_{DR1B}$, Line $P_{DR1}$ represents that a first data recovery power level is directed to the and line $D_{DR1}$ represents the resulting first data recovery HtD spacing that is smaller than the read HtD spacing. During this time, the drive circuitry attempts to read the data which could not be read while the head was at the read HtD spacing. Because, the head is closer to the storage disk, there is the opportunity to recover the data. In the event that the data is recovered, the drive can resume normal operations.

Alternatively, if the data is still not recovered, the $T_{DR2A}$ and $T_{DR2B}$ represents the time that the drive is performing a second data recovery attempt. During $TD_{O2}$ and $T_{DR2B}$, Line $P_{DR2}$ represents that a second data recovery power level is directed to the slider mover and line $D_{DR2}$ represents the resulting second data recovery HtD spacing that is smaller than the first data recovery HtD spacing. During this time the drive circuitry again attempts to read the data. In the event that the data is recovered, the drive can resume normal operations.

The exact data recovery HtD spacings and the magnitude of the data recovery power levels can vary according to the design of the drive and the design of the slider mover. In alternative, non-exclusive examples, the data recovery HtD spacings are approximately 1, 2, 3, 4, 5, or 7 nm and the data recovery power levels directed to the slider mover are approximately 340, 50, 60, or 70 mW.

It should be noted that for a given slider mover, the data recovery power levels are greater than the read power level, and the data recovery HtD spacings are less than the read HtD spacing. In alternative, nonexclusive embodiments, the difference between the data recovery power levels and the read power level is approximately 5, 10, 15, 20, 30 or 40 percent. Further, for example, the data recovery HtD spacings can be approximately 5-65 percent less than the read HtD spacing. In alternative, nonexclusive embodiments, the difference between the data recovery HtD spacings and the read HtD spacing is approximately 10, 20, 30, 35, 36, 37, 38, 39, 40, 45, 50, or 60 percent. Stated differently, in alternative, nonexclusive embodiments, the difference between the data recovery HtD spacings and the read HtD spacing is approximately 0.5, 1, 1.5, or 2 nm.

The data recovery operation, for example, can be initiated by the drive circuitry upon a determination that there is an error in the read operation. Alternatively, the data recovery operation can be initiated by other designated triggering events.

Figure 8A:
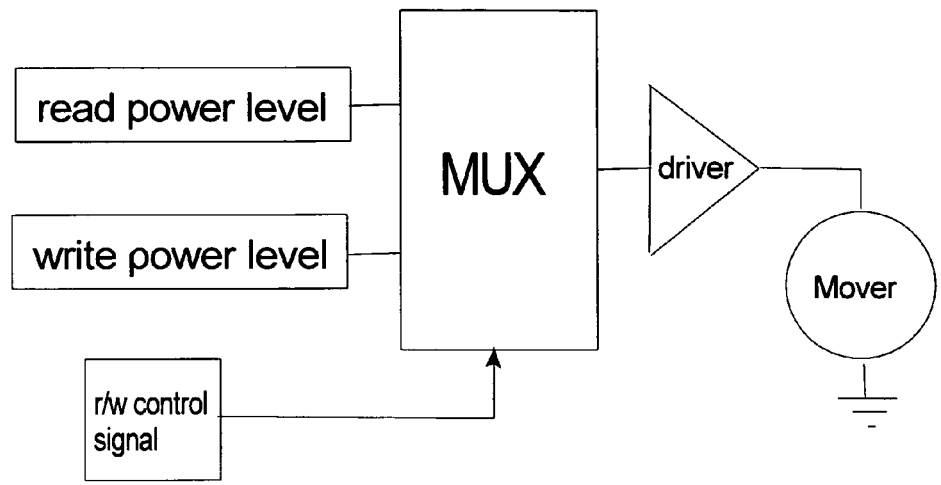
FIG. 8A is a simplified schematic of a drive circuitry having features of the present invention.

FIG. 8A is a simplified block diagram that illustrates one embodiment of the drive circuitry and the slider mover. As discussed earlier, the drive circuitry directs power the slider mover in order to cause HtD spacing adjustment. In certain embodiments, different power levels must be available for the read, pre-write, write, idle and data recovery operations and for the transitions between these operations.

In this embodiment, the transition between the power levels can be accomplished with a control signal normally sent from a HDD Controller ASIC and delivered to the read/write channel and preamp commonly known as R/-W or Write Gate. Here the R/-W control signal is used to switch between preset power levels via the Multiplexor (MUX). The driver is then responsible for delivering the specified power level to the slider mover.

Examples of the driver include a current source driver, a voltage source driver, or a hybrid or power driver. Due to the fact that a slider mover that includes a heater element will increase in resistance is a function of its temperature (which is in turn a function of the power dissipated in the element), each driver will give slightly different results.

With a current source driver, there is a change in power due to a change in resistance over temperature, the power increases linearly with increasing resistance and therefore, temperature.

With a voltage source driver, the power delivered to the heater element will be initially high but will drop in proportion to 1/R as the resistance increases. (Power is $V^2/R$). Therefore, the voltage source driver gives the beneficial decay of delivered power as a function of element resistance and temperature.

A hybrid driver could be designed to incorporate feedback based on either current draw or delivered voltage. This has the benefit of delivering power to the element as specified by the control and is insensitive to element temperature. By virtue of this, the power delivered to the element can be specified fully by the drive circuitry and also tailored to a desired response vs. time independent of temperature effects. This driver is independent of element resistance and temperature, and thereby lacks any sensitivity to temperature.

Figure 8B:
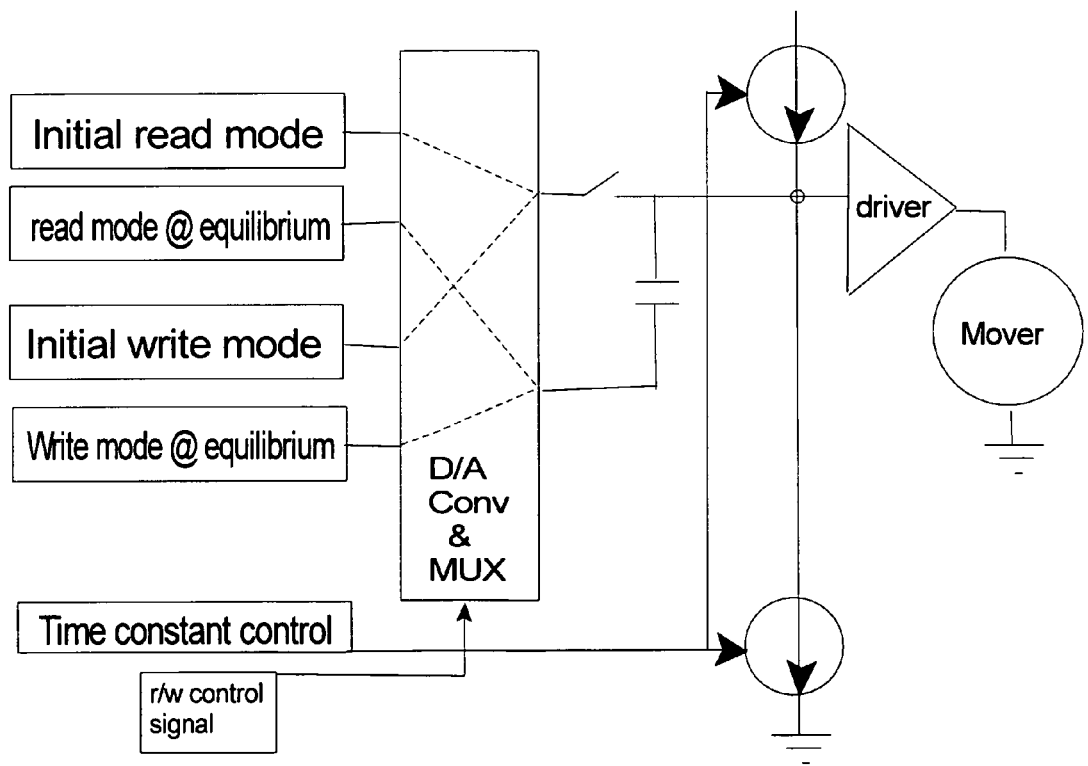
FIG. 8B is a simplified schematic of another embodiment of a drive circuitry having features of the present invention.

FIG. 8B illustrates a second embodiment of a drive circuitry and a slider mover. In this embodiment, another approach in control/driver design is to provide adjustment of delivered driver power as a function of time in compensation of both WPTP and resistance changes in the slider mover.

While the particular invention is described in detail herein, it is to be understood that it is merely illustrative of various embodiments of the invention. No limitations are intended to the details of construction or design herein shown other than as described in the appended claims.

What is claimed is:

1. A disk drive comprising:
   a drive housing;
   a storage disk that is rotatably coupled to the drive housing;
   a slider assembly including a head that reads data from the storage disk during a read operation and that writes data to the storage disk during a write operation, and a slider mover; and
   a drive circuitry that directs a read power level to the slider mover to maintain the head at a read HtD, meaning Head-to-Disk, spacing during the read operation, a pre-write power level to maintain the head at a pre-write HtD spacing during the read operation, and a write power level to maintain the head at a write HtD spacing during the write operation, wherein the power levels are different, and wherein the write power level is less than the read and pre-write power levels.

2. The disk drive of claim 1 wherein the drive circuitry directs the pre-write power level to the slider mover when the drive is performing the read operation prior to the write operation.

3. The disk drive of claim 1 wherein the read power level is greater than the pre-write and write power levels.

4. The disk drive of claim 1 wherein the pre-write HtD spacing is greater than the read HtD spacings.

5. The disk drive of claim 1 wherein the pre-write HtD spacing is at least approximately ten percent greater than the read HtD spacing.

6. The disk drive of claim 1 wherein the drive circuitry directs an idle power level to the slider mover to maintain the head at an idle HtD spacing when the drive is not performing the read operation or the write operation.

7. A disk drive comprising:
   a drive housing;
   a storage disk that is rotatably coupled to the drive housing;
   a slider assembly including a head that reads data from the storage disk during a read operation and that writes data to the storage disk during a write operation, and a slider mover; and
   a drive circuitry that directs power to the slider mover at a first power level to maintain the head at a first HtD, meaning Head-to-Disk, spacing during the read operation, a second power level to the slider mover to maintain the head at a second HtD spacing during the read operation prior to the write operation, and a third power level to the slider mover to maintain the head at a third HtD spacing during the write operations, wherein the power levels are different, and wherein the third power level is less than first and second power levels.

8. The disk drive of claim 7 wherein the first power level is greater than the second and third power levels.

9. The disk drive of claim 7 wherein the drive circuitry directs a fourth power level to maintain the head at a fourth HtD spacing when the drive is not performing the read operation or the write operation.

10. The disk drive of claim 9 wherein the first power level is greater than the second, third and fourth power levels.

11. The disk drive of claim 9 wherein the fourth power level is less than the first, second, and third power levels.

12. The disk drive of claim 7 wherein the drive circuitry directs a fourth power level when the drive is performing a data recovery operation.

13. A data storage assembly, comprising:
    a data storage surface;
    a head that reads from the data storage surface during a read operation and that writes data to the data storage surface during a write operation;
    a mover coupled to the head to position the head at different spacings relative to the data storage surface;
    circuitry that directs a read power level to the mover during the read operation, a pre-write power level during the read operation, and a write power level during the write operation, wherein the power levels are different, and wherein the write power level is less than the read and pre-write power levels.

14. The assembly of claim 13 wherein the circuitry directs the pre-write power level to the mover when the drive is performing the read operation prior to the write operation.

15. The assembly of claim 13 wherein the read power level is greater than the pre-write and write power levels.

16. The assembly of claim 13 wherein the pre-write power level maintains a first spacing from the head to the data storage surface that is greater than a second spacing from the head to the data storage surface maintained by the read power level.

17. The assembly of claim 13 wherein the first spacing is at least approximately ten percent greater than the second spacing.

18. The assembly of claim 13 wherein the circuitry directs an idle power level to the mover to maintain the head at an idle spacing when the drive is not performing the read operation or the write operation.

19. A method, comprising:
    positioning a head above a data storage surface, the head being coupled to a mover for maintaining spacing between the head and the data storage surface;
    directing a first power level to the mover during a read operation where the head reads data from the data storage surface;
    directing a second power level that is different from the first power level to the mover during the read operation; and
    directing a third power level that is different from the first power level and the second power level during a write operation where the head writes data to the data storage surface, and wherein the third power level is less than the first and second power levels.

20. The method of claim 19 wherein the second power level is directed to the mover prior to the write operation.

21. The method of claim 19 wherein the first power level is greater than the second and third power levels.

22. The method of claim 19 wherein the second power level maintains a pre-write spacing that is greater than a read spacing maintained during direction of the first power level.

23. The method of claim 22 wherein the pre-write spacing is at least approximately ten percent greater than the read spacing.

24. The method of claim 19 wherein the drive circuitry directs an idle power level to the slider mover to maintain the head at an idle spacing when the drive is not performing the read operation or the write operation.

* * * * *

UNITED STATES PATENT AND TRADEMARK OFFICE
CERTIFICATE OF CORRECTION

PATENT NO. : 7,324,299 B1
APPLICATION NO. : 11/101114
DATED : January 29, 2008
INVENTOR(S) : Schreck et al.

It is certified that error appears in the above-identified patent and that said Letters Patent is hereby corrected as shown below:

Column 19, line 49 delete "$d_1 - d_0 = (24* In(10)*)/(20*256*2\pi(F2 - F_1))(VGA[F2, D1] - VGA[F_1, D_1] + VGA[F_1, D_0] - VGA[F_2, D_1])$"

And insert -- $d_1 - d_0 = (24* In(10)*)/(20*256*2\pi(F_2 - F_1))(VGA[F2, D1] - VGA[F_1, D_1] + VGA[F_1, D_0] - VGA[F_2, D_1])$ --

Column 37, line 56 delete "operations," and insert -- operation, --

Signed and Sealed this

Tenth Day of June, 2008

JON W. DUDAS
*Director of the United States Patent and Trademark Office*